United States Patent
Reeves

(10) Patent No.: US 9,405,444 B2
(45) Date of Patent: Aug. 2, 2016

(54) USER INTERFACE WITH INDEPENDENT DRAWER CONTROL

(75) Inventor: Paul E. Reeves, Oakville (CA)

(73) Assignee: Z124, George Town (KY)

( * ) Notice: Subject to any disclaimer, the term of this patent is extended or adjusted under 35 U.S.C. 154(b) by 236 days.

(21) Appl. No.: 12/948,701

(22) Filed: Nov. 17, 2010

(65) Prior Publication Data

US 2012/0084697 A1  Apr. 5, 2012

Related U.S. Application Data

(60) Provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.
| | |
|---|---|
| *G06F 3/00* | (2006.01) |
| *G06F 3/01* | (2006.01) |
| *G06F 3/0484* | (2013.01) |
| *G06F 1/16* | (2006.01) |
| *G06F 3/0481* | (2013.01) |
| *G06F 3/0483* | (2013.01) |
| *G06F 3/0488* | (2013.01) |

(Continued)

(52) U.S. Cl.
CPC .......... *G06F 3/04842* (2013.01); *G06F 1/1616* (2013.01); *G06F 1/1641* (2013.01); *G06F 1/1647* (2013.01); *G06F 3/017* (2013.01); *G06F 3/0412* (2013.01); *G06F 3/0416* (2013.01); *G06F 3/0481* (2013.01); *G06F 3/0483* (2013.01); *G06F 3/0486* (2013.01); *G06F 3/0488* (2013.01); *G06F 3/04845* (2013.01); *G06F 3/04847* (2013.01); *G06F 3/04883* (2013.01); *G06F 3/04886* (2013.01)

(58) Field of Classification Search
USPC .......... 715/772, 863, 704, 810, 765; 345/173
See application file for complete search history.

(56) References Cited

U.S. PATENT DOCUMENTS

| | | | |
|---|---|---|---|
| 5,396,630 | A | 3/1995 | Banda et al. |
| 5,673,403 | A | 9/1997 | Brown et al. |
| 5,764,984 | A | 6/1998 | Loucks |

(Continued)

FOREIGN PATENT DOCUMENTS

| | | |
|---|---|---|
| JP | 7-219903 | 8/1995 |
| JP | 08-115144 | 5/1996 |

(Continued)

OTHER PUBLICATIONS

Mikeclay "Launching multiple programs at once using simple batch file", posted Feb. 5, 2009, http://web.archive.org/web/20090205134920/http://www.windowsreference.com/windows-2000/launch-multiple-programs-at-once-using-simple-batch-file/.*

(Continued)

*Primary Examiner* — Toan Vu
(74) *Attorney, Agent, or Firm* — Sheridan Ross P.C.

(57) ABSTRACT

Methods and apparatus for controlling the display of one or more drawers of a user interface provide a new user interface interaction. The drawers may be opened in response to a gesture input to display notification data, application data, contact data, calendar data, weather data, etc. The drawers may be opened and/or closed individually or collectively. For instance, a characteristic of the gesture (e.g., a location of the gesture) may determine which of the drawers are opened in response to the gesture input.

20 Claims, 11 Drawing Sheets

(51) Int. Cl.
  *G06F 3/0486*     (2013.01)
  *G06F 3/041*      (2006.01)

(56) References Cited

U.S. PATENT DOCUMENTS

| | | | |
|---|---|---|---|
| 5,874,928 A | 2/1999 | Kou | |
| 6,108,715 A | 8/2000 | Leach et al. | |
| 6,157,959 A | 12/2000 | Bonham et al. | |
| 6,178,503 B1 | 1/2001 | Madden et al. | |
| 6,182,158 B1 | 1/2001 | Kougiouris et al. | |
| 6,260,075 B1 | 7/2001 | Cabrero et al. | |
| 6,477,585 B1 | 11/2002 | Cohen et al. | |
| 6,486,890 B1 | 11/2002 | Harada et al. | |
| 6,507,336 B1 | 1/2003 | Lunsford | |
| 6,573,913 B1 | 6/2003 | Butler et al. | |
| 6,694,368 B1 | 2/2004 | An et al. | |
| 6,826,703 B2 | 11/2004 | Kawano et al. | |
| 6,917,963 B1 | 7/2005 | Hipp et al. | |
| 6,927,908 B2 | 8/2005 | Stark | |
| 6,961,941 B1 | 11/2005 | Nelson et al. | |
| 6,970,173 B2 | 11/2005 | Ciolac | |
| 7,069,519 B1 | 6/2006 | Okude et al. | |
| 7,127,723 B2 | 10/2006 | Endo et al. | |
| 7,284,203 B1 | 10/2007 | Meeks et al. | |
| 7,424,601 B2 | 9/2008 | Xu | |
| 7,453,465 B2 | 11/2008 | Schmieder et al. | |
| 7,478,341 B2 | 1/2009 | Dove | |
| 7,489,503 B2* | 2/2009 | Maatta | 361/679.27 |
| 7,565,535 B2 | 7/2009 | Roberts et al. | |
| 7,681,134 B1 | 3/2010 | Grechishkin et al. | |
| 7,705,799 B2* | 4/2010 | Niwa | 345/1.1 |
| 7,880,728 B2 | 2/2011 | de los Reyes et al. | |
| 7,949,633 B1 | 5/2011 | Shaver et al. | |
| 7,950,008 B2 | 5/2011 | Bhide et al. | |
| 7,960,945 B1 | 6/2011 | Onorato et al. | |
| 8,194,001 B2 | 6/2012 | Miller et al. | |
| 8,397,245 B2 | 3/2013 | Filali-Adib et al. | |
| 8,704,777 B2 | 4/2014 | Small et al. | |
| 2002/0010844 A1 | 1/2002 | Noel et al. | |
| 2002/0015881 A1 | 2/2002 | Nakamura et al. | |
| 2002/0130888 A1 | 9/2002 | Perry et al. | |
| 2002/0157001 A1 | 10/2002 | Huang et al. | |
| 2002/0158811 A1 | 10/2002 | Davis | |
| 2003/0001848 A1 | 1/2003 | Doyle et al. | |
| 2003/0017417 A1 | 1/2003 | Goodin et al. | |
| 2003/0020954 A1 | 1/2003 | Udom et al. | |
| 2003/0079010 A1 | 4/2003 | Osborn | |
| 2003/0079205 A1 | 4/2003 | Miyao et al. | |
| 2003/0115443 A1 | 6/2003 | Cepulis et al. | |
| 2003/0131143 A1 | 7/2003 | Myers | |
| 2003/0174172 A1 | 9/2003 | Conrad et al. | |
| 2003/0177285 A1 | 9/2003 | Hunt et al. | |
| 2003/0179541 A1* | 9/2003 | Sullivan | 361/681 |
| 2003/0226116 A1 | 12/2003 | Kuwata et al. | |
| 2004/0137855 A1 | 7/2004 | Wiley et al. | |
| 2004/0141085 A1 | 7/2004 | Nickel et al. | |
| 2004/0226023 A1 | 11/2004 | Tucker | |
| 2005/0034017 A1 | 2/2005 | Airaud et al. | |
| 2005/0083642 A1* | 4/2005 | Senpuku et al. | 361/681 |
| 2005/0193267 A1 | 9/2005 | Liu et al. | |
| 2005/0216594 A1 | 9/2005 | O'Brien et al. | |
| 2005/0237587 A1 | 10/2005 | Nakamura | |
| 2005/0246505 A1 | 11/2005 | McKenney et al. | |
| 2005/0248501 A1* | 11/2005 | Kim | 345/1.1 |
| 2006/0005187 A1 | 1/2006 | Neil | |
| 2006/0031572 A1 | 2/2006 | Feuerstein et al. | |
| 2006/0107020 A1 | 5/2006 | Stillwell, Jr. et al. | |
| 2006/0136828 A1 | 6/2006 | Asano | |
| 2006/0139862 A1* | 6/2006 | Wang et al. | 361/681 |
| 2006/0183505 A1* | 8/2006 | Willrich | 455/566 |
| 2006/0187142 A1* | 8/2006 | Lesniak | 345/1.1 |
| 2006/0227806 A1 | 10/2006 | Tseng | |
| 2006/0248404 A1 | 11/2006 | Lindsay et al. | |
| 2007/0005661 A1 | 1/2007 | Yang | |
| 2007/0014295 A1 | 1/2007 | Fernandes et al. | |
| 2007/0022155 A1 | 1/2007 | Owens et al. | |
| 2007/0033260 A1 | 2/2007 | Grouzdev et al. | |
| 2007/0050751 A1 | 3/2007 | Husmann et al. | |
| 2007/0067769 A1 | 3/2007 | Geisinger | |
| 2007/0085759 A1 | 4/2007 | Lee et al. | |
| 2007/0111750 A1 | 5/2007 | Stohr et al. | |
| 2007/0136356 A1 | 6/2007 | Smith et al. | |
| 2007/0164923 A1* | 7/2007 | Kanai et al. | 345/1.1 |
| 2007/0182663 A1* | 8/2007 | Biech | 345/1.1 |
| 2007/0198760 A1 | 8/2007 | Han | |
| 2007/0271522 A1 | 11/2007 | Son et al. | |
| 2007/0285401 A1* | 12/2007 | Ohki et al. | 345/173 |
| 2007/0288941 A1 | 12/2007 | Dunshea et al. | |
| 2008/0024388 A1* | 1/2008 | Bruce | 345/1.1 |
| 2008/0057910 A1 | 3/2008 | Thoresson et al. | |
| 2008/0062625 A1* | 3/2008 | Batio | 361/680 |
| 2008/0071595 A1 | 3/2008 | Chang et al. | |
| 2008/0082815 A1 | 4/2008 | Kawano et al. | |
| 2008/0090525 A1 | 4/2008 | Joo | |
| 2008/0119237 A1* | 5/2008 | Kim | 455/566 |
| 2008/0119731 A1 | 5/2008 | Becerra et al. | |
| 2008/0134061 A1 | 6/2008 | Banerjee et al. | |
| 2008/0155103 A1 | 6/2008 | Bailey | |
| 2008/0244599 A1 | 10/2008 | Hodson et al. | |
| 2008/0291283 A1 | 11/2008 | Achiwa et al. | |
| 2008/0299951 A1 | 12/2008 | Karkanias et al. | |
| 2009/0037649 A1 | 2/2009 | Xu | |
| 2009/0055749 A1 | 2/2009 | Chatterjee et al. | |
| 2009/0083829 A1 | 3/2009 | Peterson | |
| 2009/0089569 A1 | 4/2009 | Baribault et al. | |
| 2009/0100429 A1 | 4/2009 | Thoelke et al. | |
| 2009/0109468 A1 | 4/2009 | Barclay et al. | |
| 2009/0119580 A1 | 5/2009 | Rohrabaugh et al. | |
| 2009/0138219 A1 | 5/2009 | Nemoto | |
| 2009/0158299 A1 | 6/2009 | Carter | |
| 2009/0164930 A1* | 6/2009 | Chen et al. | 715/769 |
| 2009/0176571 A1* | 7/2009 | Sternberg | 463/36 |
| 2009/0217071 A1 | 8/2009 | Huang et al. | |
| 2009/0219254 A1* | 9/2009 | Lai et al. | 345/173 |
| 2009/0249247 A1 | 10/2009 | Tseng et al. | |
| 2009/0249331 A1 | 10/2009 | Davis et al. | |
| 2009/0256780 A1 | 10/2009 | Small et al. | |
| 2009/0257657 A1* | 10/2009 | Temmermans et al. | 382/195 |
| 2009/0278806 A1 | 11/2009 | Duarte et al. | |
| 2009/0298546 A1* | 12/2009 | Kim et al. | 455/566 |
| 2009/0305743 A1 | 12/2009 | Gouesbet et al. | |
| 2009/0313440 A1 | 12/2009 | Kim et al. | |
| 2009/0322690 A1* | 12/2009 | Hiltunen et al. | 345/173 |
| 2009/0327560 A1 | 12/2009 | Yalovsky | |
| 2010/0005396 A1 | 1/2010 | Nason et al. | |
| 2010/0007603 A1 | 1/2010 | Kirkup | |
| 2010/0013863 A1 | 1/2010 | Harris | |
| 2010/0046026 A1 | 2/2010 | Heo | |
| 2010/0049775 A1 | 2/2010 | Rajawat | |
| 2010/0060549 A1 | 3/2010 | Tsern | |
| 2010/0063994 A1 | 3/2010 | Cook et al. | |
| 2010/0064228 A1 | 3/2010 | Tsern | |
| 2010/0064244 A1 | 3/2010 | Kilpatrick et al. | |
| 2010/0064536 A1 | 3/2010 | Caskey et al. | |
| 2010/0066763 A1 | 3/2010 | Macdougall et al. | |
| 2010/0079355 A1* | 4/2010 | Kilpatrick et al. | 345/1.3 |
| 2010/0085274 A1 | 4/2010 | Kilpatrick et al. | |
| 2010/0085301 A1 | 4/2010 | Cohen et al. | |
| 2010/0085382 A1* | 4/2010 | Lundqvist et al. | 345/659 |
| 2010/0097386 A1 | 4/2010 | Kim et al. | |
| 2010/0107163 A1 | 4/2010 | Lee | |
| 2010/0122271 A1 | 5/2010 | Labour et al. | |
| 2010/0149121 A1 | 6/2010 | Alexander et al. | |
| 2010/0157518 A1* | 6/2010 | Ladouceur et al. | 361/679.09 |
| 2010/0164836 A1* | 7/2010 | Liberatore | 345/1.1 |
| 2010/0177019 A1* | 7/2010 | Jeong et al. | 345/1.3 |
| 2010/0177047 A1* | 7/2010 | Brenneman et al. | 345/173 |
| 2010/0182265 A1* | 7/2010 | Kim et al. | 345/173 |
| 2010/0207903 A1 | 8/2010 | Kim et al. | |
| 2010/0211769 A1 | 8/2010 | Shankar et al. | |
| 2010/0227650 A1* | 9/2010 | Kim et al. | 455/566 |
| 2010/0245256 A1* | 9/2010 | Estrada et al. | 345/173 |
| 2010/0246119 A1 | 9/2010 | Collopy et al. | |
| 2010/0250975 A1 | 9/2010 | Gill et al. | |

(56) References Cited

U.S. PATENT DOCUMENTS

| | | | |
|---|---|---|---|
| 2010/0251233 A1 | 9/2010 | Majewski et al. | |
| 2010/0319008 A1 | 12/2010 | Ho | |
| 2010/0321275 A1* | 12/2010 | Hinckley et al. | 345/1.3 |
| 2011/0012858 A1* | 1/2011 | Brookes et al. | 345/173 |
| 2011/0016299 A1 | 1/2011 | Galicia et al. | |
| 2011/0016301 A1 | 1/2011 | Galicia et al. | |
| 2011/0018901 A1* | 1/2011 | Boorman et al. | 345/629 |
| 2011/0025625 A1* | 2/2011 | Hirako | 345/173 |
| 2011/0034214 A1* | 2/2011 | Hong et al. | 455/566 |
| 2011/0063192 A1* | 3/2011 | Miller et al. | 345/1.1 |
| 2011/0093691 A1 | 4/2011 | Galicia et al. | |
| 2011/0093836 A1 | 4/2011 | Galicia et al. | |
| 2011/0096014 A1 | 4/2011 | Fuyuno et al. | |
| 2011/0102314 A1 | 5/2011 | Roux | |
| 2011/0113329 A1* | 5/2011 | Pusateri | 715/702 |
| 2011/0115713 A1* | 5/2011 | Altman et al. | 345/169 |
| 2011/0115737 A1* | 5/2011 | Fuyuno et al. | 345/173 |
| 2011/0126216 A1 | 5/2011 | Galicia et al. | |
| 2011/0167492 A1 | 7/2011 | Ghosh et al. | |
| 2011/0193806 A1 | 8/2011 | Kim et al. | |
| 2011/0209102 A1 | 8/2011 | Hinckley et al. | |
| 2011/0210922 A1* | 9/2011 | Griffin | 345/173 |
| 2011/0216064 A1* | 9/2011 | Dahl et al. | 345/428 |
| 2011/0225538 A1 | 9/2011 | Oyagi et al. | |
| 2011/0239142 A1* | 9/2011 | Steeves et al. | 715/764 |
| 2011/0246904 A1 | 10/2011 | Pinto et al. | |
| 2011/0260997 A1 | 10/2011 | Ozaki | |
| 2011/0267478 A1* | 11/2011 | Jacobs | 348/207.11 |
| 2011/0273464 A1 | 11/2011 | Brunner et al. | |
| 2011/0273475 A1 | 11/2011 | Herz et al. | |
| 2011/0289444 A1* | 11/2011 | Winsky | 715/776 |
| 2011/0291964 A1* | 12/2011 | Chambers et al. | 345/173 |
| 2011/0312349 A1 | 12/2011 | Forutanpour | |
| 2012/0005602 A1 | 1/2012 | Anttila et al. | |
| 2012/0005691 A1 | 1/2012 | Wong et al. | |
| 2012/0026069 A1 | 2/2012 | Ohsaki | |
| 2012/0060089 A1 | 3/2012 | Heo et al. | |
| 2012/0066581 A1* | 3/2012 | Spalink | 715/232 |
| 2012/0076197 A1 | 3/2012 | Byford et al. | |
| 2012/0081278 A1 | 4/2012 | Freedman | |
| 2012/0081353 A1 | 4/2012 | Yusupov et al. | |
| 2012/0081354 A1 | 4/2012 | Yusupov et al. | |
| 2012/0081380 A1 | 4/2012 | Reeves et al. | |
| 2012/0081383 A1 | 4/2012 | Reeves et al. | |
| 2012/0081396 A1 | 4/2012 | Yusupov et al. | |
| 2012/0084480 A1 | 4/2012 | Reeves et al. | |
| 2012/0084481 A1 | 4/2012 | Reeves et al. | |
| 2012/0084542 A1 | 4/2012 | Reeves et al. | |
| 2012/0084675 A1 | 4/2012 | Sirpal et al. | |
| 2012/0084791 A1 | 4/2012 | Benedek et al. | |
| 2012/0084792 A1 | 4/2012 | Benedek et al. | |
| 2012/0084793 A1 | 4/2012 | Reeves et al. | |
| 2012/0084798 A1 | 4/2012 | Reeves et al. | |
| 2012/0086716 A1 | 4/2012 | Reeves et al. | |
| 2012/0086717 A1 | 4/2012 | Liu | |
| 2012/0089906 A1 | 4/2012 | Reeves et al. | |
| 2012/0089992 A1 | 4/2012 | Reeves et al. | |
| 2012/0094716 A1 | 4/2012 | Reeves | |
| 2012/0172088 A1 | 7/2012 | Kirch et al. | |
| 2012/0176413 A1 | 7/2012 | Kulik et al. | |
| 2012/0188185 A1 | 7/2012 | Cassar | |
| 2012/0278747 A1 | 11/2012 | Abraham et al. | |
| 2012/0278750 A1 | 11/2012 | Abraham et al. | |
| 2013/0019183 A1 | 1/2013 | Reeves et al. | |
| 2013/0024778 A1 | 1/2013 | Reeves et al. | |
| 2013/0167159 A1 | 6/2013 | Ricci et al. | |

FOREIGN PATENT DOCUMENTS

| | | |
|---|---|---|
| JP | 2008-225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008/132924 | 11/2008 |
| WO | WO 2012/044510 | 4/2012 |
| WO | WO 2012/044518 | 4/2012 |
| WO | WO 2012/044645 | 4/2012 |
| WO | WO 2012/044738 | 4/2012 |
| WO | WO 2012/044872 | 4/2012 |

OTHER PUBLICATIONS

U.S. Appl. No. 13/187,026, filed Jul. 20, 2011, Chen.
U.S. Appl. No. 13/399,901, filed Feb. 17, 2012, Reeves et al.
U.S. Appl. No. 13/484,951, filed May 31, 2012, Sirpal et al.
U.S. Appl. No. 13/485,734, filed May 31, 2012, Reeves et al.
U.S. Appl. No. 13/624,565, filed Sep. 21, 2012, Sirpal et al.
U.S. Appl. No. 13/628,380, filed Sep. 27, 2012, Reeves.
U.S. Appl. No. 13/628,157, filed Sep. 27, 2012, Kretz.
U.S. Appl. No. 13/628,170, filed Sep. 27, 2012, Kretz.
U.S. Appl. No. 13/628,234, filed Sep. 27, 2012, Kretz.
U.S. Appl. No. 13/629,415, filed Sep. 27, 2012, Reeves.
U.S. Appl. No. 13/628,949, filed Sep. 27, 2012, Reeves et al.
Burns, C., "Motorola ATRIX 4G Laptop Dock Review," at www.androidcommunity.com/motorola-atrix-4g-laptop-dock-review-20110220/, Feb. 20, 2011, 5 pages.
Catacchio, Chad, "This smartphone has two huge screens . . . that rotate," The Next Web at www.thenextweb.com/asia/2010/10/07/this-smartphone-has-two-huge-screens-that-rotate/, Jul. 21, 2011, 2 pages.
Google images, accessed Apr. 18, 2011, 6 pages.
Google Transliteration IME website, 2010, available at www.google.com/ime/transliteration/help.html#features, 8 pages.
Harman03, "Kyocera Echo Dual-screen Android Phone," posted 4 weeks from Apr. 18, 2011, 3 pages.
InputKing Online Input System, 2011, available at www.inputking.com, 2 pages.
"Lapdock™ for Motorola ATRIX," at www.motorola.com/Consumers/US-EN/Consumer-Product-and-Services/Mobile . . . , accessed Apr. 18, 2011, 1 page.
"Motorola ATRIX 4G Laptop Dock Review," at www.phonearena.com/reviews/Motorola-ATRIX-4G-Laptop-Dock-Review_id2667, Mar. 2, 2011, 6 pages.
SAKHR Software—Arabic Optical Character Recognition, Jul. 15, 2011, available at www.sakhr.com/ocr.aspx, 1 page.
Stein, S., "How does the Motorola Atrix 4G Lapdock compare with a laptop?" Crave—CNET, at www.news.cnet.com/8301-17938_105-20031251-1.html, Feb. 9, 2011, 7 pages.
Website entitled, "Kyocera Echo," at www.echobykyocera.com/, 2011, 6 pages.
Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.
Wikipedia, "Balloon help," Jul. 18, 2011, available at www.en.wikipedia.org/wiki/Balloon_help, 3 pages.
Wikipedia, "Google Pinyin," Aug. 27, 2011 available at www.en.wikipedia.org/wiki/Google_Pinyin, 3 pages.
Wikipedia, "Mouseover," Sep. 29, 2011, available at www.en.wikipedia.org/wiki/Mouseover, 2 pages.
Wikipedia, "Predictive text," Aug. 7, 2011, available at www.en.wikipedia.org/wiki/Predictive_test, 6 pages.
Wikipedia, "Sogou Pinyin," Jul. 23, 2011 available at www.en.wikipedia.org/wiki/Sogou_Pinyin, 3 pages.
Wikipedia, "Status bar," Sep. 8, 2011, available at www.en.wikipedia.org/wiki/Status_bar, 3 pages.
Wikipedia, "Tooltip," Sep. 17, 2011, available at www.en.wikipedia.org/wiki/Tooltip, 2 pages.
International Search Report for International Patent Application No. PCT/US11/52822, mailed Apr. 27, 2012, 5 pages.
International Search Report for International Patent Application No. PCT/US11/52598, mailed Mar. 27, 2012, 3 pages.
International Search Report for International Patent Application No. PCT/US11/53835, mailed Apr. 30, 2012, 5 pages.

(56) References Cited

OTHER PUBLICATIONS

Written Opinion for International Patent Application No. PCT/US11/53835, mailed Apr. 30, 2012, 4 pages.
International Search Report for International Patent Application No. PCT/US11/54105, mailed Apr. 30, 2012, 3 pages.
International Search Report for International Patent Application No. PCT/US11/53585, mailed May 4, 2012, 3 pages.
Official Action for U.S. Appl. No. 13/484,951, mailed Aug. 17, 2012, 13 pages.
U.S. Appl. No. 13/843,086, filed Mar. 15, 2013, Reeves et al.
"Apple iPod and iPhone dock Connector Pinout," AllPinouts, Sep. 27, 2010, 3 pages [www.allpinouts.org/index/php/Apple_iPod,_iPad_and_iPhone_dock].
"How to Install Ubuntu on Your Nexus One/Android!" NexusOneHacks.net, Jul. 6, 2010, 9 pages [nexusonehacks.net/nexus-one-hacks/how-to-install-ubuntu-on-your-android].
Dutko, "Domo Arigato Mr Androidato—An Introduction to the New Google Mobile Linux Framework, Android," Linux Journal, Mar. 2008, vol. 2008, Iss. 167, 9 pages.
Stallman "GNU Operating System: Android and Users' Freedom," Sep. 2, 2013, 4 pages [gnu.org/philosophy/android-and-users-freedom.html].
Sud, et al., "Dynamic Migration of Computation Through Virtualization of the Mobile Platform," Mobile Networks and Applications, 2012, (published online Feb. 22, 2011), vol. 17, Iss. 2, pp. 206-215.
International Search Report and Written Opinion for International Patent Application No. PCT/US2012/046800, mailed Feb. 20, 2013, 9 pages.
International Search Report and Written Opinion for International Patent Application No. PCT/US2012/046802, mailed Feb. 20, 2013, 9 pages.
International Search Report for International Patent Application No. PCT/US2011/056149, mailed Apr. 24, 2012, 5 pages.
Written Opinion for International Patent Application No. PCT/US2011/056149, mailed Apr. 24, 2012, 4 pages.
International Preliminary Report on Patentability for International Patent Application No. PCT/US2011/056149, mailed Apr. 25, 2013, 6 pages.
International Preliminary Report on Patentability for International (PCT) Patent Application No. PCT/US2011/052822, mailed Apr. 11, 2013 7 pages.
International Preliminary Report on Patentability for International (PCT) Patent Application No. PCT/US2011/052598, mailed Apr. 11, 2013 9 pages.
International Preliminary Report on Patentability for International (PCT) Patent Application No. PCT/US2011/053835, mailed Apr. 11, 2013 6 pages.
International Search Report for International Patent Application No. PCT/US2011/053130, mailed Apr. 24, 2012, 5 pages.
Written Opinion for International Patent Application No. PCT/US2011/053130, mailed Apr. 24, 2012, 4 pages.
International Preliminary Report on Patentability for International Patent Application No. PCT/US2011/053130, mailed Apr. 11, 2013, 6 pages.
International Search Report for International Patent Application No. PCT/US2011/053826, mailed Apr. 27, 2012, 5 pages.
Written Opinion for International Patent Application No. PCT/US2011/053826, mailed Apr. 27, 2012, 4 pages.
International Preliminary Report on Patentability for International Patent Application No. PCT/US2011/053826, mailed Apr. 11, 2013, 6 pages.
International Search Report for International Patent Application No. PCT/US2011/052988, mailed May 3, 2012, 5 pages.
Written Opinion for International Patent Application No. PCT/US2011/052988, mailed May 3, 2012, 4 pages.
International Preliminary Report on Patentability for International Patent Application No. PCT/US2011/052988, mailed Apr. 11, 2013, 6 pages.
International Search Report for International Patent Application No. PCT/US2011/054605, mailed Apr. 30, 2012, 5 pages.
Written Opinion for International Patent Application No. PCT/US2011/054605, mailed Apr. 30, 2012, 5 pages.
International Preliminary Report on Patentability for International Patent Application No. PCT/US2011/054605, mailed Apr. 11, 2013, 7 pages.
International Search Report for International Patent Application No. PCT/US2011/053909, mailed Apr. 30, 2012, 5 pages.
Written Opinion for International Patent Application No. PCT/US2011/053909, mailed Apr. 30, 2012, 4 pages.
International Preliminary Report on Patentability for International Patent Application No. PCT/US2011/053909, mailed Apr. 11, 2013, 6 pages.
International Search Report for International Patent Application No. PCT/US2011/054623, mailed Apr. 27, 2012, 5 pages.
Written Opinion for International Patent Application No. PCT/US2011/054623, mailed Apr. 27, 2012, 4 pages.
International Preliminary Report on Patentability for International Patent Application No. PCT/US2011/054623, mailed Apr. 11, 2013, 6 pages.
International Search Report for International Patent Application No. PCT/US2011/053037, mailed Mar. 20, 2012, 5 pages.
Written Opinion for International Patent Application No. PCT/US2011/053037, mailed Mar. 20, 2012, 6 pages.
International Preliminary Report on Patentability for International Patent Application No. PCT/US2011/053037, mailed Apr. 11, 2013, 8 pages.
International Search Report for International Patent Application No. PCT/US2011/053923, mailed Apr. 30, 2012, 5 pages.
Written Opinion for International Patent Application No. PCT/US2011/053923, mailed Apr. 30, 2012, 4 pages.
International Preliminary Report on Patentability for International Patent Application No. PCT/US2011/053923, mailed Apr. 11, 2013, 6 pages.
International Search Report for International Patent Application No. PCT/US2011/054017, mailed Apr. 24, 2012, 5 pages.
Written Opinion for International Patent Application No. PCT/US2011/054017, mailed Apr. 24, 2012, 4 pages.
International Preliminary Report on Patentability for International Patent Application No. PCT/US2011/054017, mailed Apr. 11, 2013, 6 pages.
International Preliminary Report on Patentability for International (PCT) Patent Application No. PCT/US2011/054105, mailed Apr. 11, 2013 5 pages.
International Preliminary Report on Patentability for International (PCT) Patent Application No. PCT/US2011/053585, mailed Apr. 11, 2013 6 pages.
International Search Report for International Patent Application No. PCT/US2011/053665, mailed Apr. 30, 2012, 5 pages.
Written Opinion for International Patent Application No. PCT/US2011/053665, mailed Apr. 30, 2012, 4 pages.
International Preliminary Report on Patentability for International Patent Application No. PCT/US2011/053665, mailed Apr. 11, 2013, 6 pages.
International Search Report for International Patent Application No. PCT/US2011/053691, mailed May 4, 2012, 5 pages.
Written Opinion for International Patent Application No. PCT/US2011/053691, mailed May 4, 2012, 4 pages.
International Preliminary Report on Patentability for International Patent Application No. PCT/US2011/053691, mailed Apr. 11, 2013, 6 pages.
International Search Report for International Patent Application No. PCT/US2011/054019, mailed Apr. 10, 2012, 5 pages.
Written Opinion for International Patent Application No. PCT/US2011/054019, mailed Apr. 10, 2012, 4 pages.
International Preliminary Report on Patentability for International Patent Application No. PCT/US2011/054019, mailed Apr. 11, 2013, 6 pages.
International Search Report for International Patent Application No. PCT/US2011/053127, mailed Apr. 24, 2012, 5 pages.
Written Opinion for International Patent Application No. PCT/US2011/053127, mailed Apr. 24, 2012, 4 pages.

(56) References Cited

OTHER PUBLICATIONS

International Preliminary Report on Patentability for International Patent Application No. PCT/US2011/053127, mailed Apr. 11, 2013, 6 pages.
Official Action for U.S. Appl. No. 13/247,719, mailed Mar. 29, 2013 16 pages.
Official Action for U.S. Appl. No. 13/247,719, mailed Aug. 16, 2013 20 pages.
Official Action for U.S. Appl. No. 13/484,951, mailed Mar. 11, 2013 11 pages.
Official Action for U.S. Appl. No. 13/484,951, mailed Jul. 25, 2013 12 pages.
Official Action for U.S. Appl. No. 13/399,901, mailed Aug. 2, 2013 17 pages.
Official Action for U.S. Appl. No. 13/399,936, mailed Sep. 10, 2013 23 pages.
Official Action for U.S. Appl. No. 12/905,920 mailed Dec. 7, 2012, 13 pages.
Official Action for U.S. Appl. No. 12/905,920 mailed Mar. 15, 2012, 12 pages.
Official Action for U.S. Appl. No. 12/905,920 mailed Jul. 3, 2012, 14 pages.
Official Action for U.S. Appl. No. 12/905,920 mailed Apr. 25, 2013, 16 pages.
Official Action for U.S. Appl. No. 12/905,920, mailed Sep. 30, 2013 20 pages.
Official Action for U.S. Appl. No. 12/948,686, mailed Jul. 26, 2013 11 pages.
Official Action for U.S. Appl. No. 13/246,665, mailed Apr. 24, 2013 30 pages.
Official Action for U.S. Appl. No. 246,665, mailed Aug. 28, 2013 33 pages.
Official Action for U.S. Appl. No. 13/217,099 mailed Apr. 10, 2013, 53 pages.
Official Action for U.S. Appl. No. 13/217,099, mailed Oct. 9, 2013 74 pages.
Official Action for U.S. Appl. No. 13/247,885 mailed Mar. 19, 2013, 19 pages.
Notice of Allowance for U.S. Appl. No. 13/247,885, mailed Aug. 29, 2013 12 pages.
Official Action for U.S. Appl. No. 13/217,108, mailed Oct. 11, 2013 13 pages.
Official Action for U.S. Appl. No. 13/251,427 mailed Feb. 15, 2013, 18 pages.
Official Action for U.S. Appl. No. 13/251,427, mailed Oct. 21, 2013 17 pages.
Official Action for U.S. Appl. No. 13/247,166 mailed Mar. 21, 2013, 4 pages Restriction Requirement.
Official Action for U.S. Appl. No. 13/247,166, mailed Jul. 2, 2013 12 pages.
Official Action for U.S. Appl. No. 13/217,130 mailed Mar. 15, 2013, 12 pages.
Official Action for U.S. Appl. No. 13/217,130, mailed Sep. 16, 2013 12 pages.
Official Action for U.S. Appl. No. 13/247,170 mailed Apr. 11, 2013, 36 pages.
Official Action for U.S. Appl. No. 13/247,170, mailed Aug. 5, 2013 34 pages.
Official Action for U.S. Appl. No. 13/246,669 mailed Jan. 8, 2013, 14 pages.
Official Action for U.S. Appl. No. 13/246,699, mailed Jul. 12, 2013 18 pages.
Notice of Allowance for U.S. Appl. No. 13/246,669, mailed Sep. 11, 2013 16 pages.
Official Action for U.S. Appl. No. 13/246,671, mailed Mar. 27, 2013 34 pages.
Official Action for U.S. Appl. No. 13/246,671, mailed Jul. 15, 2013.
Official Action for U.S. Appl. No. 13/246,128 mailed May 10, 2013, 40 pages.
Official Action for U.S. Appl. No. 13/246,128, mailed Aug. 23, 2013 46 pages.
Official Action for U.S. Appl. No. 13/246,133 mailed Apr. 16, 2013, 25 pages.
Official Action for U.S. Appl. No. 13/246,133, mailed Aug. 23, 2013 32 pages.
Official Action for U.S. Appl. No. 13/246,675 mailed May 1, 2013, 27 pages.
Official Action for U.S. Appl. No. 13/246,675, mailed Sep. 27, 2013 32 pages.
Official Action for U.S. Appl. No. 13/217,121 mailed Mar. 6, 2013, 11 pages.
Official Action for U.S. Appl. No. 13/217,121, mailed Aug. 1, 2013 11 pages.
U.S. Appl. No. 14/068,662, filed Oct. 31, 2013, Benedek.
Kilpatrick et al., "Securing the X Window System with SELinux," NAI Labs Report No. 03-006, 2003, 33 pages.
Official Action for U.S. Appl. No. 13/399,929, mailed Dec. 3, 2013 21 pages.
Notice of Allowance for U.S. Appl. No. 13/247,166, mailed Nov. 4, 2013 14 pages.
Official Action for U.S. Appl. No. 13/246,671, mailed Nov. 20, 2013 50 pages.
International Search Report for International (PCT) Patent Application No. PCT/US2012/046798, mailed Feb. 20, 2013 3 pages.
International Preliminary Report on Patentability for International (PCT) Patent Application No. PCT/US2012/046798, mailed Jan. 23, 2014 6 pages.
International Preliminary Report on Patentability for International (PCT) Patent Application No. PCT/US2012/046800, mailed Jan. 23, 2014 6 pages.
Extended Search Report for European Patent Application No. 11829766.2, dated Jan. 8, 2014 11 pages.
Official Action for U.S. Appl. No. 13/484,951, mailed Jan. 30, 2014 12 pages.
Final Action for U.S. Appl. No. 13/399,901, mailed Dec. 26, 2013 20 pages.
Official Action for U.S. Appl. No. 12/948,686, mailed Jan. 29, 2014 13 pages.
Notice of Allowance for U.S. Appl. No. 13/247,885, mailed Jan. 9, 2014 8 pages.
Official Action for U.S. Appl. No. 13/250,764, mailed Dec. 11, 2013 23 pages.
Official Action for U.S. Appl. No. 13/247,170, mailed Dec. 11, 2013 47 pages.
Official Action for U.S. Appl. No. 13/246,128, mailed Dec. 26, 2013 43 pages.
Official Action for U.S. Appl. No. 13/246,133, mailed Jan. 15, 2014 37 pages.
Official Action for U.S. Appl. No. 13/217,121, mailed Feb. 10, 2014 12 pages.
Official Action for Mexican Patent Application No. MX/a/2013/003515, mailed Jun. 12, 2014, 3 pages (includes English summary).
Official Action for European Patent Application No. 11829880.1, mailed Aug. 13, 2014, 5 pages.
Official Action for U.S. Appl. No. 13/247,719, mailed Aug. 29, 2014 21 pages.
Official Action for U.S. Appl. No. 13/624,565, mailed Oct. 14, 2014 36 pages.
Official Action for U.S. Appl. No. 13/628,380, mailed Sep. 12, 2014 16 pages.
Official Action for U.S. Appl. No. 13/628,157, mailed Aug. 14, 2014 7 pages.
Official Action for U.S. Appl. No. 13/628,234, mailed Sep. 12, 2014 9 pages.
Official Action for U.S. Appl. No. 13/628,949, mailed Oct. 9, 2014 11 pages.
Official Action for U.S. Appl. No. 13/399,929, mailed Jun. 18, 2014 35 pages.
Notice of Allowance for U.S. Appl. No. 13/399,936, mailed Sep. 15, 2014 11 pages.
Official Action for U.S. Appl. No. 13/246,665, mailed Jun. 12, 2014 39 pages.

(56) References Cited

OTHER PUBLICATIONS

Official Action for U.S. Appl. No. 14/068,662, mailed Jul. 28, 2014 26 pages.
Official Action for U.S. Appl. No. 13/217,108, mailed Jun. 20, 2014 18 pages.
Notice of Allowance for U.S. Appl. No. 13/217,108, mailed Jul. 11, 2014 7 pages.
Official Action for U.S. Appl. No. 13/250,764, mailed Jul. 1, 2014 26 pages.
Official Action for U.S. Appl. No. 13/217,130, mailed Aug. 5, 2014 19 pages.
Notice of Allowance for U.S. Appl. No. 13/247,170, mailed Sep. 23, 2014 11 pages.
Notice of Allowance for U.S. Appl. No. 13/246,671, mailed Sep. 25, 2014 9 pages.
Official Action for U.S. Appl. No. 13/246,118, mailed Oct. 8, 2014 10 pages.
Official Action for U.S. Appl. No. 13/246,128, mailed Jun. 13, 2014 50 pages.
Official Action for U.S. Appl. No. 13/246,133, mailed Jun. 13, 2014 44 pages.
Notice of Allowance for U.S. Appl. No. 13/246,675, mailed Jul. 29, 2014 9 pages.
Official Action for U.S. Appl. No. 13/217,121, mailed Jun. 12, 2014 13 pages.
Official Action for U.S. Appl. No. 13/399,901, mailed Oct. 29, 2014 23 pages.
Haselton, "Celio Announces Redfly Smart Phone Dock, Software for Windows PCs," Laptop Magazine, Jan. 8, 2009, [retrieved on Feb. 11, 2014], 4 pages. Retrieved from: blog.laptopmag.com/redfly-launches-smartphone-dock-software-for-windows-pcs.
McDermott "Porting Android to a new device," Embedded Software, Jan. 28, 2010, 12 pages [retrieved from: http://yidonghan.wordpress.com/2010/01/28/porting-android-to-a-new-device/].
Rebecka & Zingo, "Share memory using ashmem and binder in the android framework," Android Blog, Mar. 22, 2010, 14 pages [retrieved from: http://www.androidenea.com/2010/03/share-memory-using-ashmem-and-binder-in.html].

International Preliminary Report on Patentability for International Patent Application No. PCT/US2012/046802, mailed Jan. 23, 2014, 6 pages.
Notice of Allowance for U.S. Appl. No. 13/484,951, mailed May 12, 2014 7 pages.
Official Action for U.S. Appl. No. 13/624,565, mailed Jun. 5, 2014 30 pages.
Official Action for U.S. Appl. No. 13/628,380, mailed Jun. 5, 2014 16 pages.
Official Action for U.S. Appl. No. 13/629,415, mailed Apr. 25, 2014 16 pages.
Official Action for U.S. Appl. No. 13/399,901, mailed May 1, 2014 17 pages.
Official Action for U.S. Appl. No. 13/399,936, mailed Feb. 20, 2014 27 pages.
Notice of Allowance for U.S. Appl. No. 12/905,920, mailed Feb. 27, 2014 13 pages.
Notice of Allowance for U.S. Appl. No. 12/948,686, mailed May 9, 2014 7 pages.
Official Action for U.S. Appl. No. 13/246,665, mailed Feb. 27, 2014 38 pages.
Official Action for U.S. Appl. No. 13/217,099, mailed May 29, 2014 73 pages.
Official Action for U.S. Appl. No. 13/217,108 mailed Feb. 25, 2014, 22 pages.
Official Action for U.S. Appl. No. 13/251,427, mailed May 23, 2014 15 pages.
Official Action for U.S. Appl. No. 13/217,130, mailed Mar. 20, 2014 18 pages.
Official Action for U.S. Appl. No. 13/247,170, mailed Jun. 5, 2014 58 pages.
Notice of Allowance for U.S. Appl. No. 13/246,669, mailed Apr. 11, 2014 11 pages.
Official Action for U.S. Appl. No. 13/246,671, mailed Jun. 5, 2014 60 pages.
Official Action for U.S. Appl. No. 13/246,675, mailed Mar. 7, 2014 34 pages.

* cited by examiner

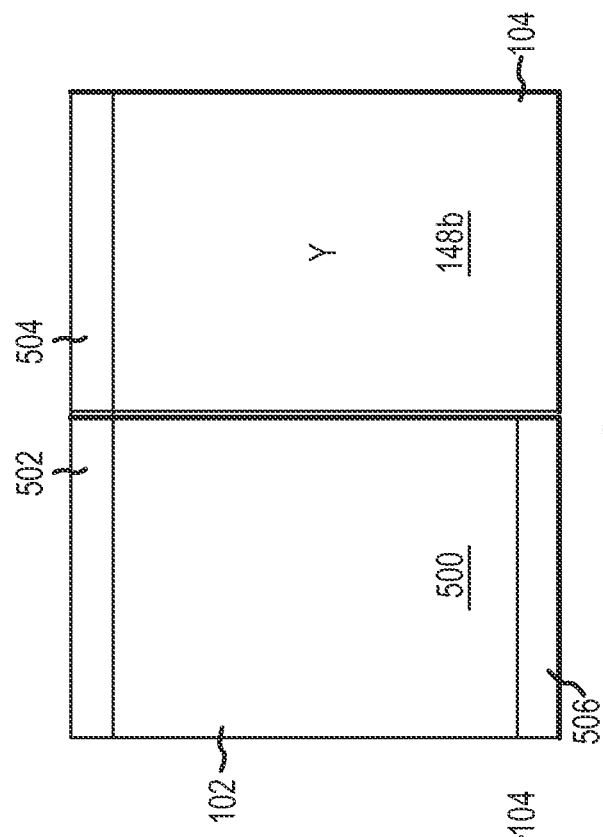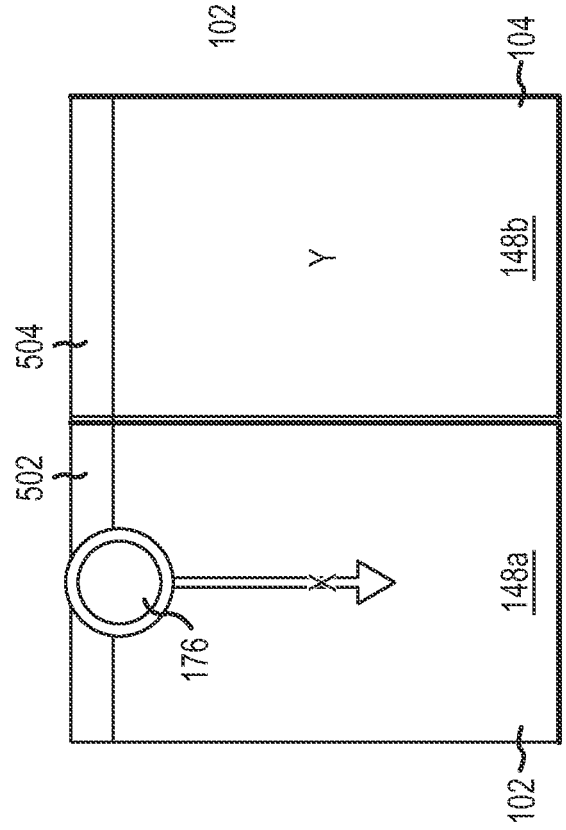

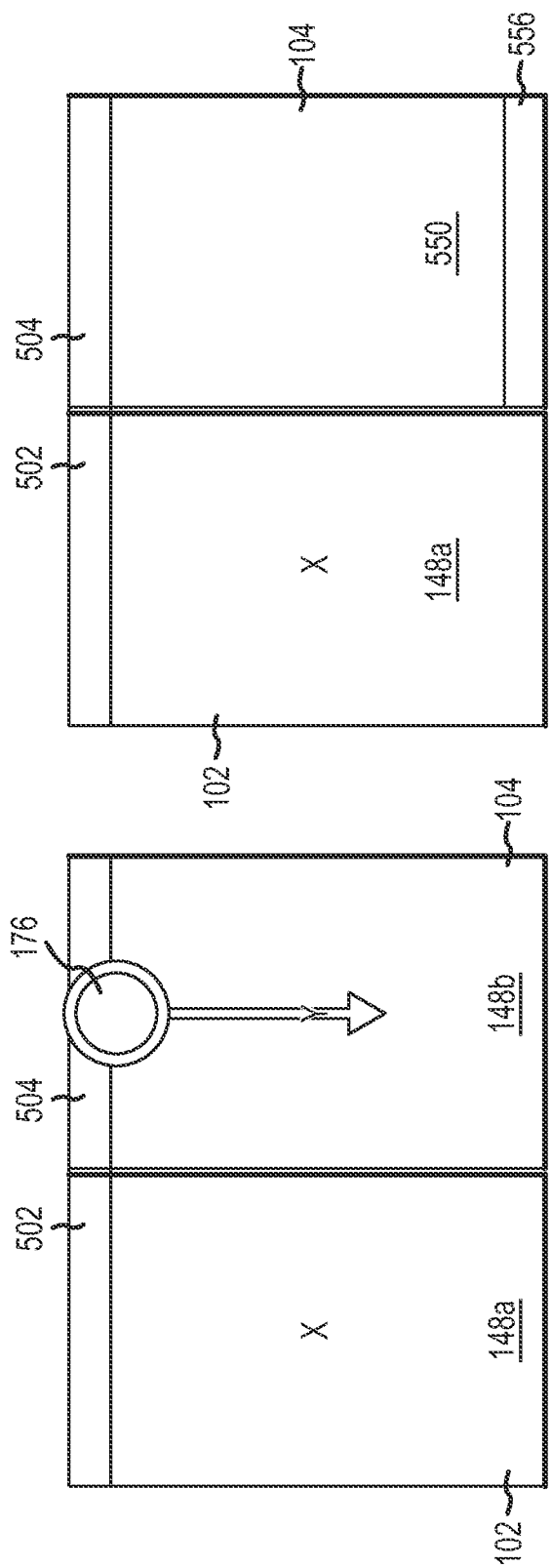

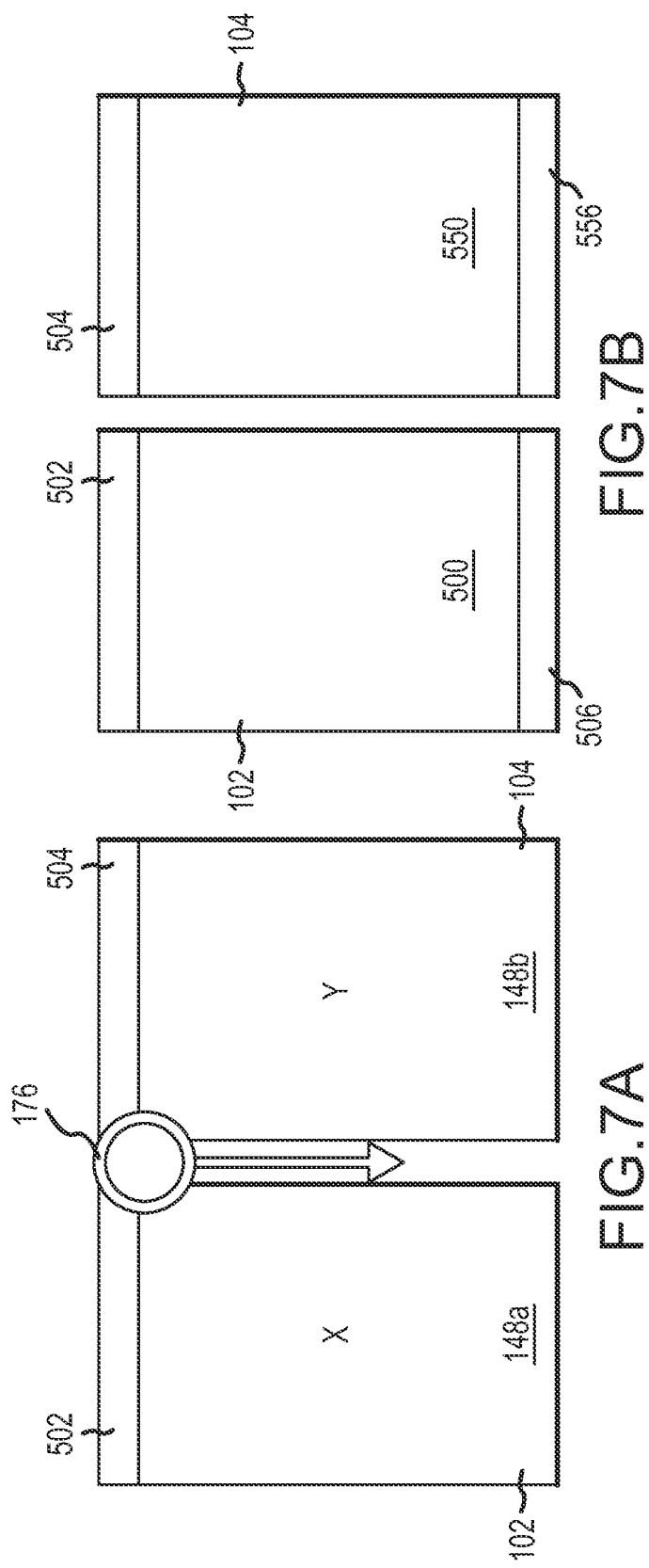

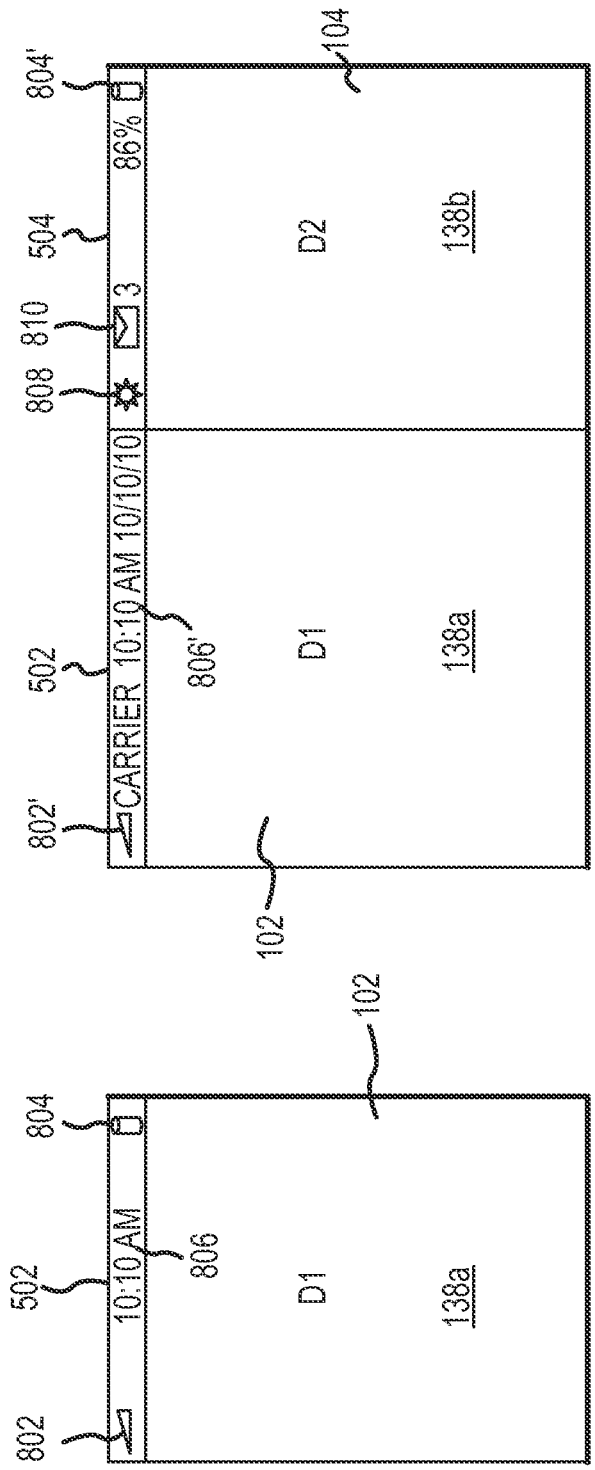

USER INTERFACE WITH INDEPENDENT DRAWER CONTROL

RELATED APPLICATIONS

This application claims priority to U.S. Provisional Application Ser. No. 61/389,000, filed Oct. 1, 2010, entitled "DUAL DISPLAY WINDOWING SYSTEM"; Provisional Application Ser. No. 61/389,117, filed Oct. 1, 2010, entitled "MULTI-OPERATING SYSTEM PORTABLE DOCKING DEVICE"; and Provisional Application Ser. No. 61/389,087, filed Oct. 1, 2010, entitled "TABLET COMPUTING USER INTERFACE". Each and every part of the foregoing provisional applications is hereby incorporated by reference in their entirety.

BACKGROUND

As the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

For instance, the majority of current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as eInk or OLED surfaces, to allow for reconfiguration of the keys, even in these cases, the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower than a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the user display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but are crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application. This conflict between user interface and screen space severely limits the degree to which the touch based user interface may be used in an intuitive manner.

SUMMARY

A first aspect includes a method for controlling a handheld computing device. The method includes displaying a first screen on a first display and a second screen on a second display. Additionally, the method involves maintaining a first drawer that is selectively displayable on the first display and a second drawer that is selectively displayable on the second display. The method also includes receiving a gesture input at a gesture sensor of the handheld computing device and opening at least one of the first drawer and the second drawer in response to the receiving step. A characteristic of the gesture input at least partially determines which of the first and second drawers is opened.

A second aspect is a system for controlling a handheld computing device. The system includes a processor, a first display in operative communication with the processor that is operable to selectively display a first drawer containing first data therein, and a second display in operative communication with the processor that is operable to selectively display second drawer containing second data therein. The system further includes at least one gesture sensor operable to receive a gesture input from a user. Upon receipt of said gesture input from a user, one or more of the first and second drawers is displayed.

A number of feature refinements and additional features are applicable to the first and second aspects. These feature refinements and additional features may be used individually or in any combination. As such, each of the following features that will be discussed may be, but are not required to be, used with any other feature or combination of features of any of the aspects presented herein.

In one embodiment, the characteristic may include a location at which the gesture is received. For instance, when the gesture input is received at a first location, the first drawer may be opened. When the gesture input is received at a second location, the second drawer may be opened. When the gesture is received at a third location, both the first drawer and the second drawers may be opened. In this regard, the first location may include at least a portion of the first display and the second location may include at least a portion of the second display. The third location may be between the first and second locations. The first display may be positioned adjacent to the second display along an interface, such that the third location may be a predetermined distance from the interface.

In another embodiment, a graphical portion may be provided at the first, second, and third locations. The graphical portion may be manipulatable by a user to open one or more corresponding drawers. For instance, the graphical portion may be at least a portion of a status bar. Further still, a handle may be provided with the one or more corresponding drawers when displayed. The handle may be manipulatable by a user to close the one or more corresponding drawers.

In various embodiments, the first drawer and second drawer may be operable to contain data such as notification data, application data, contact data, calendar data, weather data, or a combination thereof. The first drawer and the second drawer may contain the same data or, alternatively, the drawers may contain different data.

A third aspect includes a method for controlling a handheld computing device. The method includes operating the handheld computing device in a first state. When in the first state, a first display is visible from the perspective of a user. The first display is operative to render a status portion. The method also includes disposing the handheld computing device in a second state. In the second state, the first display and a second display are visible from the perspective of the user. The method also includes modifying the status portion to be rendered on the first display and the second display in response to the disposing.

A fourth aspect includes a handheld computing device. The device includes a first display and a second display that is arranged with respect to the first display. The second display is positionable between a first position and a second position with respect to the first display. When in the first position, only one of the first display and the second display are viewable from the perspective of a user, and when in the second position the first and the second display are viewable from the perspective of a user. In response to change in position from the first position to the second position, a status bar displayed on the first display is modified to be displayed on the first display and the second display.

A number of feature refinements and additional features are applicable to the third and fourth aspects. These feature refinements and additional features may be used individually or in any combination. As such, each of the following features that will be discussed may be, but are not required to be, used with any other feature or combination of features of any of the aspects presented herein.

In one embodiment, additional content may be added to the status portion in the second state. When in the second state, the status portion may include a unitary portion extending between the first and second displays. More information may be displayed on the status bar when in the second position than when in the first position.

BRIEF DESCRIPTION OF THE DRAWINGS

FIGS. 5A and 5B are graphical representations of an embodiment of a handheld computing device functioning in response to a gesture.

FIGS. 6A and 6B are graphical representations of another embodiment of a handheld computing device operating in response to a gesture.

FIGS. 7A and 7B are graphical representations of yet another embodiment of handheld computing device functioning in response to a gesture input.

FIG. 8 is a graphical representation of a status bar according to one embodiment of a handheld computing device including a detailed view thereof.

DETAILED DESCRIPTION

The present disclosure is generally related to gesture inputs for interaction with a computing device. The interface controls are particularly suited for control of devices that have one or more displays capable of displaying graphical user interfaces (GUIs) on a handheld portable device. The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
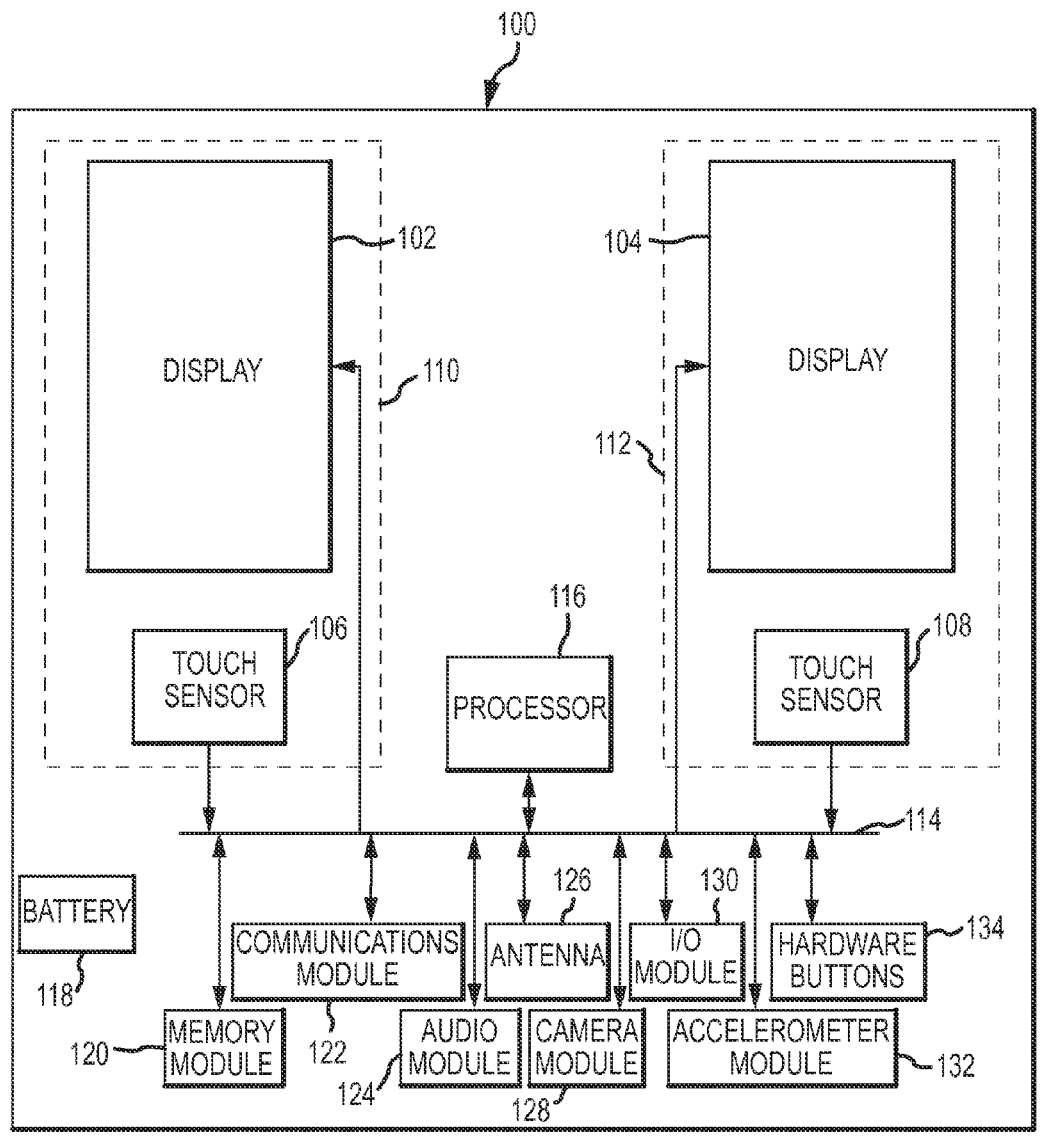
FIG. 1 is a schematic view of an embodiment of a handheld computing device.

FIG. 1 depicts an embodiment of a handheld computing device 100. The handheld computing device 100 may include a first display 102 and a second display 104. Additionally, while two displays (102, 104) may be shown and described below with regard to the functionality of various embodiments of handheld computing devices, a handheld computing device may be provided that includes one or more displays. In any regard, the first display 102 and the second display 104 may be independently controllable. The displays may be operative to display a displayed image or "screen". As used herein, the term "display" is intended to connote device hardware, whereas "screen" is intended to connote the displayed image produced on the display. In this regard, a display is a physical hardware that is operable to render a screen. A screen may encompass a majority of the display. For instance, a screen may occupy substantially all of the display area except for areas dedicated to other functions (e.g., menu bars, status bars, etc.) A screen may be associated with an application and/or an operating system executing on the handheld computing device 100. For instance, application screens or desktop screens may be displayed. An application may have various kinds of screens that are capable of being manipulated as will be described further below. In an embodiment, each display may have a resolution of 480 pixels by 800 pixels, although higher and lower resolution displays may also be provided.

A screen may be associated with an operating system, an application, or the like. In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays of a handheld computing device, the screens displayed on the one or more displays, and various user input devices may comprise a GUI that allows a user to exploit functionality of the handheld computing device.

The handheld computing device 100 may be configurable between a first position and a second position. In the first position, a single display (e.g., the first display 102 or the second display 104) may be visible from the perspective of a user. Both displays 102, 104 may be exposed on an exterior of the handheld device 100 when in the first position, but the displays 102, 104 may be arranged in a non-adjacent manner such that both displays 102, 104 are not concurrently visible from the perspective of a user (e.g., one display may be visible from the front of the device 100 and the other display may be visible from the back of the device 100).

The handheld computing device 100 may also be provided in the second position such that the displays 102, 104 may be concurrently viewable from the perspective of a user (e.g., the displays 102, 104 may be positioned adjacent to one another). The displays 102, 104 may be displayed in the second position such that the displays 102, 104 are arranged end-to-end or side-by-side. Additionally, the displays 102, 104 may be arranged in a portrait orientation or a landscape orientation with respect to a user. As will be discussed further below, a portrait orientation is intended to describe an arrangement of the handheld computing device, wherein the longer dimension of the display of the handheld computing device is vertically oriented (e.g., with respect to gravity or the perspective of a user). A landscape orientation is intended to describe an arrangement wherein the shorter dimension of the display of the handheld computing device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area may be arranged in a landscape orientation, and vice versa. Additionally, the displays and screens may be in different respective orientations. For instance, when the displays are in a landscape orientation, one or more screens may be rendered in a portrait orientation on the displays or vice versa.

The handheld computing device 100 may be manipulated between the first position (i.e., a single display visible from a user's perspective) and the second position (i.e., at least two displays concurrently visible from the user's perspective) in a variety of manners. For instance, the device 100 may include a slider mechanism such that the first and second displays 102, 104 are disposable adjacent to one another in a parallel fashion in a second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. In this regard, both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided in greater detail below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc.

While the foregoing has referenced two displays 102 and 104, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position. Additionally, in one embodiment, the two displays 102 and 104 may comprise separate portions of a unitary display (not shown). As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include one or more input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld computing device 100 may include at least a first touch sensor 106. Furthermore, the handheld computing device may include a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 comprise a first touch screen display 110. In this regard, the first touch sensor 106 may be transparent or translucent and positioned with respect to the first display 102 such that a corresponding touch received at the first touch sensor 106 may be correlated to the first display 102 (e.g., to interact with a screen rendered on the first display 102). Similarly, the second display 104 and the second touch sensor 108 may comprise a second touch screen display 112. In this regard, the second touch sensor 108 may be positioned with respect to the second display 104 such that a touch received at the second touch sensor 108 may be correlated to the second display 104 (e.g., to interact with a screen rendered on the second display 104). Alternatively, the first touch sensor 106 and/or the second touch sensor 108 may be provided separately from the displays 102, 104. Furthermore, in an alternate embodiment, only a single gesture sensor may be provided that allows for inputs to control both the first display 102 and the second display 104. The single gesture sensor may also be provided separately or integrally with the displays.

In this regard, the first and second touch sensors 106, 108 may have the substantially same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

Figure 9A:
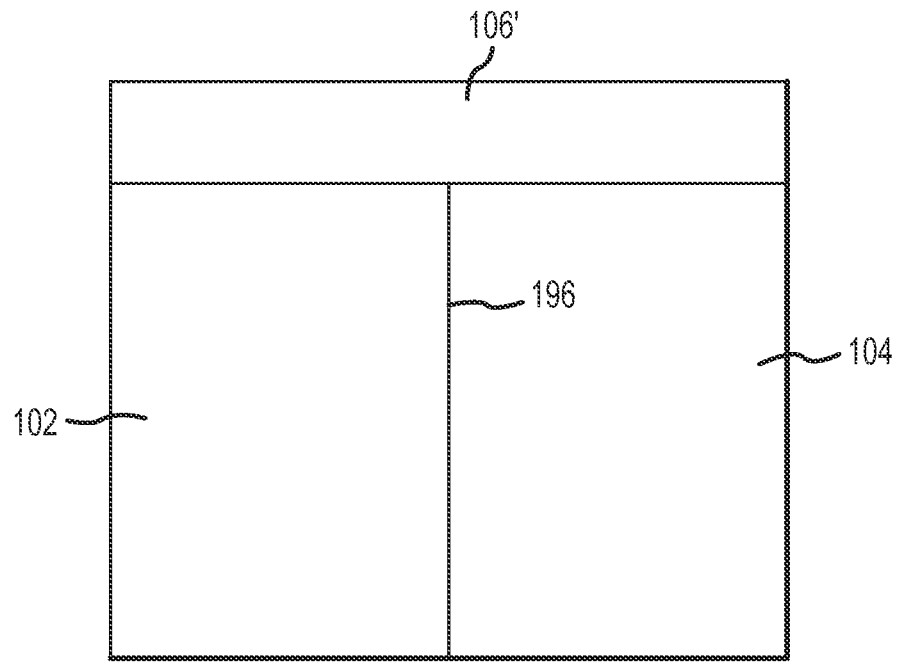
FIGS. 9A-B are schematic views of embodiments of a handheld computing device provided with touch sensitive devices.
Figure 9B:
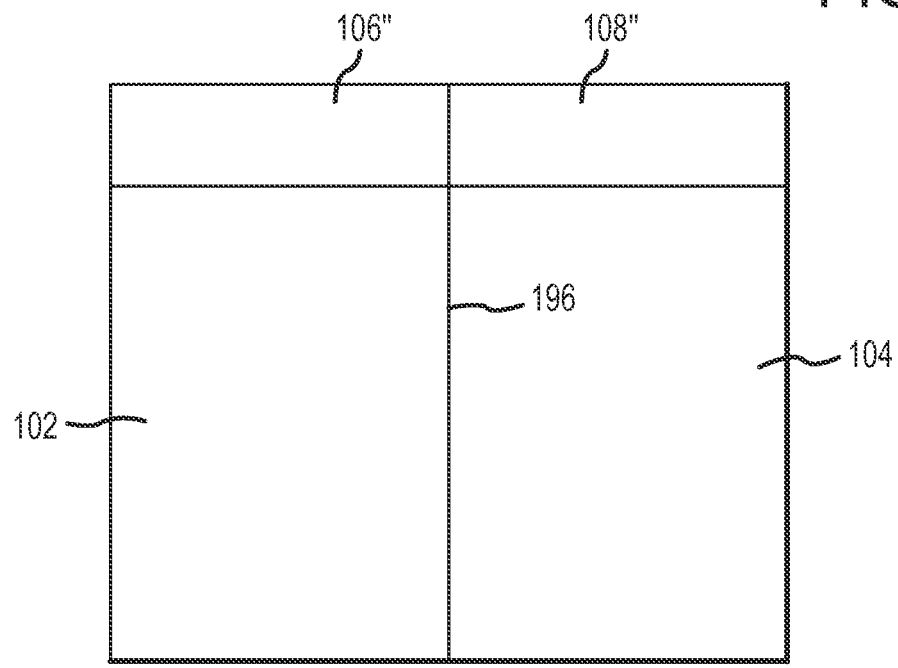

With reference to FIGS. 9A-B, various potential arrangements are depicted for the first display 102, the second display 104, and touch sensors 106', 106", and 108". In FIG. 9A, the first 102 and second display 104 are arranged side-by-side such that a crease 196 separates the displays. In this regard, the first display 102 and second display 104 may be arranged in a clam-shell type arrangement such that the crease 196 includes a hinge that allows for pivotal movement between the first display 102 and second display 104 as discussed above. A touch sensor 106' may span the width of both the first display 102 and the second display 104. In this regard, the touch sensor 106' may span the crease 196 without interruption. Alternatively, as shown in FIG. 9B, separate touch sensors 106" and 108" may be provided on either side of the crease 196. In this regard, each of the touch sensors 106" and 108" may span the width of each of the first display 102 and second display 104, respectively.

In any of the arrangements shown in FIGS. 9A-B, the displays (102, 104) may also comprise touch screen displays that may be used in conjunction with touch sensitive portions that are provided separately from the touch screen displays. Thus, displays 102 and 104 may both comprise touch screen displays and be provided in addition to touch sensitive devices 106', 106", and 108". Accordingly, a combination of touch screen displays (e.g., 110, 112) and off display touch sensors (e.g., 106', 106", 108") may be provided for a single device. Touch inputs may be received at both a touch screen display (110, 112) and off display touch sensor (106', 106", 108"). In this regard, gestures received at an off screen display sensor may have a different functionality than the same gesture received at a touch screen display. Also, a touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

The handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below. For instance, the processor 116 may be in direct communication with one more of the additional components 120-134 or may communicate with the one or more additional components 120-134 via the data bus 114. Furthermore, while the discussion below may describe the additional components 120-134 being in operative communication with the data bus 114, in other embodiments any of the additional components 120-134 may be in direct operative communication with any of the other additional components 120-134. Furthermore, the processor 116 may be operative to independently control the first display 102 and the second display 104 and may be operative to receive input from the first touch sensor 106 and the second touch sensor 108. The processor 116 may comprise one or more different processors. For example, the processor 116 may comprise one or more application specific integrated circuits (ASICs), one or more field-programmable gate arrays (FPGAs), one or more general purpose processors operative to execute machine readable code, or a combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, a volume control, a home screen button, an end button, a send button, a menu button, etc.

With further reference to FIGS. 2A-D, various screens of an embodiment of a device are shown. multiple screens may be shown, only one or a subset of the multiple screens may be shown on the displays of the device at any one moment. In this regard, a screen may be described in a relative location to the displays or other screens (e.g., to the left of a display, to the right of a display, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 2A-D may display a number of different screens that may be displayed at various instances of operation of a handheld device and are not intended to be presented in any particular order or arrangement. Single screen applications and multi screen applications may be provided. A single screen application is intended to describe an application that is capable of producing a screen that may occupy only a single display at a time. A multi screen application is intended to describe an application that is capable of producing one or more screens that may simultaneously occupy multiple displays. Additionally, a multi screen application may occupy a single display. In this regard, a multi screen application may have a single screen mode and a multi screen mode.

Figure 2A:
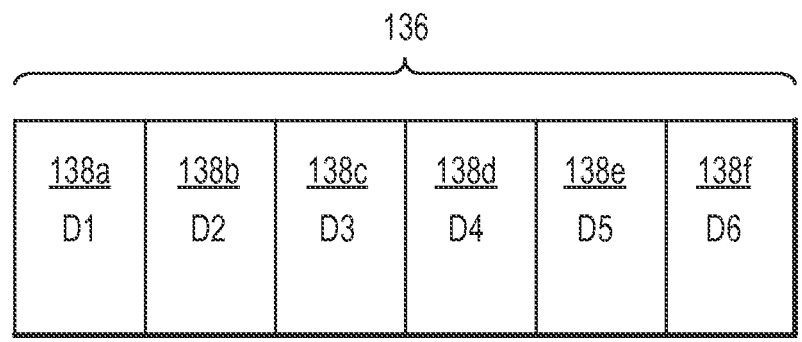
FIGS. 2A-D are graphical representations of an embodiment of a handheld computing device in various instances of operation.

A desktop sequence 136 is displayed in FIG. 2A. The desktop sequence 136 may include a number of individual desktop screens 138a-138f. Thus, each desktop screen 138 may occupy substantially the entirety of a single display (e.g., the first display 102 or second display 104 of FIG. 1). The desktop screens 138a-138f may be in a predetermined order such that the desktop screens 138a-138f appear consecutively and the order in which the desktop screens appear may not be reordered. However, the desktop screens 138a-138f may be sequentially navigated (e.g., in response to a user input). That is, one or more of the desktop screens 138a-138f may be sequentially displayed on a handheld device as controlled by a user input.

Figure 2B:
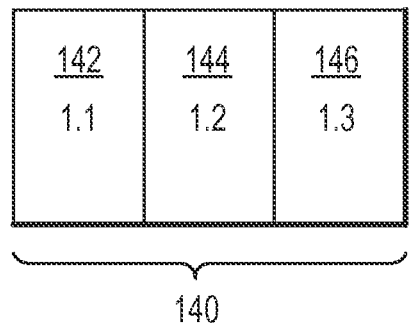
Figure 2C:
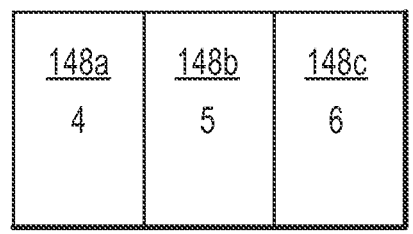

Additionally, FIG. 2B displays a hierarchal application sequence 140 of a multi screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related as parent/children. A node screen may also serve as a parent to a leaf screen 146. By leaf screen 146, it is meant that the leaf screen 146 has no corresponding node screen 144 for which the leaf screen 146 is a parent. As such, the leaf screen does not have any children node screens 144. FIG. 2C depicts various single screen applications 148a, 148b, and 148c arranged sequentially. Each of these single screen applications may correspond to a different executing application. For instance, in FIG. 2C Application 4, Application 5, and Application 6 may be executing on the device and correspond to each single screen 148a, 148b, and 148c, respectively.

Figure 2D:
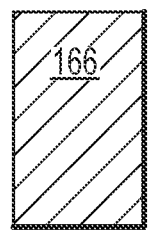

FIG. 2D also includes an empty view 166. The empty view 166 may be used during transitions of a screen (e.g., movement of screen between a first display and a second display). It is not necessary that the empty view 166 be interpretable by the user as an effective GUI screen. The empty view 166 merely communicates to the user that an action regarding the screen (e.g., the movement of the screen with respect to one or more displays) is occurring. An application displaying an empty view 166 need not be able to rest, wait, process or interpret input. The empty view 166 may display a screen, or a representation thereof, as it is being moved in proportion to the amount of the screen that has been moved from a first display to a second display as will be discussed in greater detail below. In this regard, the empty view 166 may be used to relate information regarding the position of a screen during a transition of the screen (e.g., in response to gesture). An empty view 166 is only intended to refer to a screen not capable of receiving an input (e.g., a screen in transition). In this regard, the display of an empty view 166 may include an animation or the like showing the response of a screen as it is being moved or changed (e.g., modified into or out of a landscape mode).

Figure 3A:
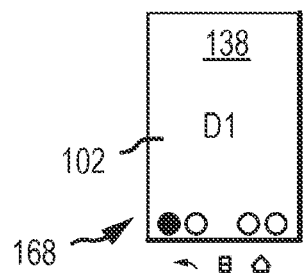
FIGS. 3A-K are graphical representations of an embodiment of a handheld computing device provided in different positions, orientations, and instances of operation.
Figure 3B:
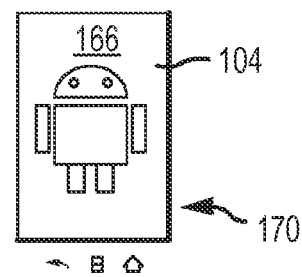
Figure 3C:
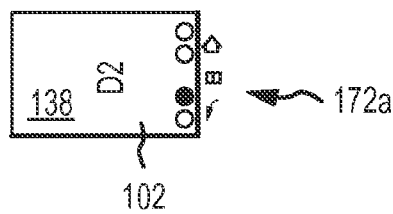
Figure 3D:
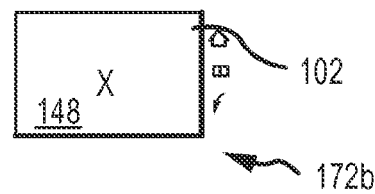
Figure 3E:
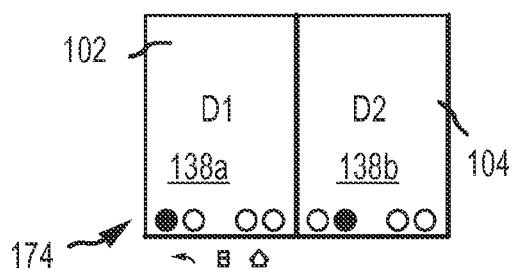
Figure 3F:
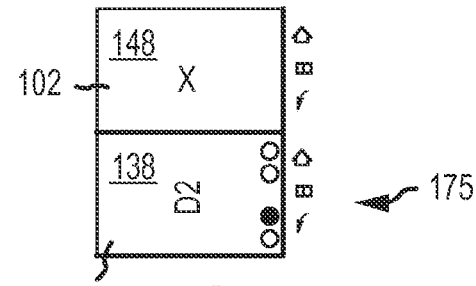
Figure 3G:
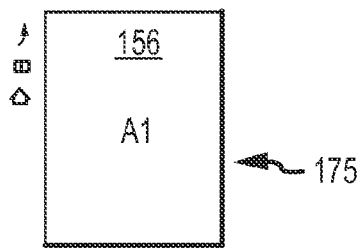
Figure 3H:
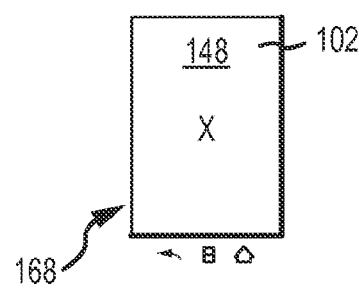

FIGS. 3A-K depict various arrangements and statuses of displays 102, 104 of a device that are possible in various embodiments of a handheld computing device according to the present disclosure. For instance, when in the first (e.g., closed) position, a closed front display 168 may be visible as shown in FIG. 3A. The closed front display 168 may correspond with the first display 102 or the second display 104. The closed front 168 as displayed may be occupied by a desktop screen D1 138 as shown in FIG. 3A. Alternatively, an application with a single screen or a multi screen application in single screen mode may be displayed in the closed front 168. A closed back display 170 may be viewable from an opposite side of the display when the device is in a closed position, as shown in FIG. 3B. The closed back 170 may display a different desktop screen or application screen than the closed front 168 (e.g., as shown in FIG. 3H) or may simply display an empty view 166 (e.g., displaying an icon or other graphic) and lack functionality as an interface.

FIG. 3C depicts a closed device in a landscape orientation 172*a*. In one embodiment, a landscape mode (i.e., wherein the display is adjusted to display a screen in a landscape orientation) may not be enabled as shown in FIG. 3C. Alternatively, the landscape mode may be enabled such that the screen (e.g., application screen 148) is modified when the device is sensed in a landscape orientation 172*b*, such that the screen 148 is rendered in a landscape orientation as shown at FIG. 3D.

The device may further be provided in a second (e.g., open) position 174 as shown in FIG. 3E. In the open position 174, at least two displays 102, 104 are arranged such that the two displays 102, 104 are both visible from the vantage point of a user. The two displays 102, 104 may be arranged in a side-by-side fashion when in the open position 174. Thus, each of the two displays 102, 104 may display separate screens. For instance, the displays 102, 104 may each display a separate desktop screen 138*a*, 138*b*, respectively. While the individual displays 102 and 104 are in a portrait orientation as shown in FIG. 3E, it may be appreciated that the full display area (comprising both the first display 102 and the second display 104) may be arranged in a landscape orientation. Thus, whether the device as depicted in FIG. 3E is in a landscape or portrait orientation may depend on whether the displays are being used individually or collectively. If used collectively as a unitary display, the device may be in a landscape orientation, whereas if the displays are used separately, the orientation shown in FIG. 3E may be referred to as a portrait orientation.

Additionally, when the device is in an open position 174 as shown in FIG. 3F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 3F, a single screen 148 may occupy a first display 102 and the second display 104 may display a desktop screen 138. The single screen 148 may be displayed in a landscape or portrait mode. Alternatively, a device in an open orientation may display a multi screen application 156 that may occupy both displays 102, 104 in a portrait orientation as shown in FIG. 3G such that the individual displays are in a landscape orientation.

Figure 3I:
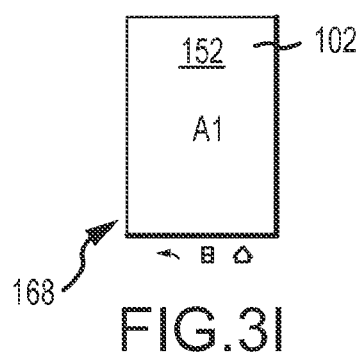
Figure 3J:
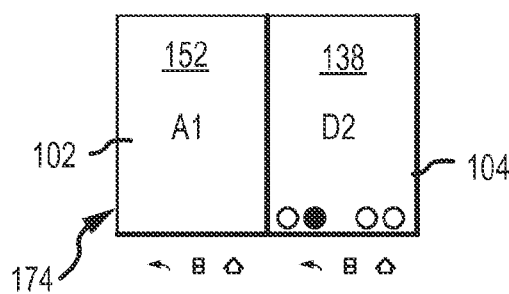
Figure 3K:
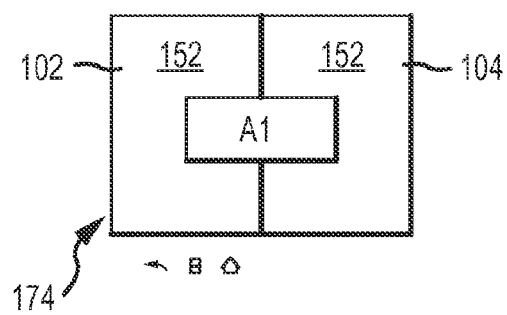

FIGS. 3I-K depict the potential arrangements of the screens of a multi screen application 152. The multi screen application 152 may, in one mode, occupy a single display 102 when the device is in a closed position 168 as shown in FIG. 3I. That is, the multi screen application 152 may be in a single screen mode. Alternatively, when the device is in an open position as shown in FIG. 3J, the multi screen application 152 may still occupy a single display 102 in single screen mode. Furthermore, the multi screen application 152 may be expanded to occupy both displays 102, 104 when the device is in the open position as shown in FIG. 3K. In this regard, the multi screen application 152 may also execute in a multi screen mode. Various options may be provided for expanding the multi screen application 152 from a single screen mode to a multi screen mode.

For example, the multi screen application 152 may be maximized from a single screen mode displayed in a single display to two screens displayed in two displays such that a parent screen is displayed in the first display and a node screen (e.g., a child screen) is expanded into the second display. In this regard, each of the screens displayed in the first and second display may be independent screens that comprise part of a hierarchical application sequence (e.g., as shown in FIG. 2B). Alternatively, the single screen mode of the multi screen application may simply be scaled such that the contents of the single screen are scaled to occupy both displays. Thus, the same content displayed in the single screen is scaled to occupy multiple displays, but no additional viewing area or graphics are presented. Further still, the maximization of the multi screen application from a single screen mode to a multi screen mode may result in the expansion of the viewable area of the application. For example, if a multi screen application is displayed in single screen mode, upon maximization into multi screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi screen application. Furthermore, a multi screen application may be configurable as to the nature of the expansion of the multi screen application between a single screen mode and a multi screen mode. These configuration values may be default values that may be changed or may be permanent values for various applications. These configuration values may be communicated to the device (e.g., the processor 116) to dictate the behavior of the application when executing on the device.

Figure 4:
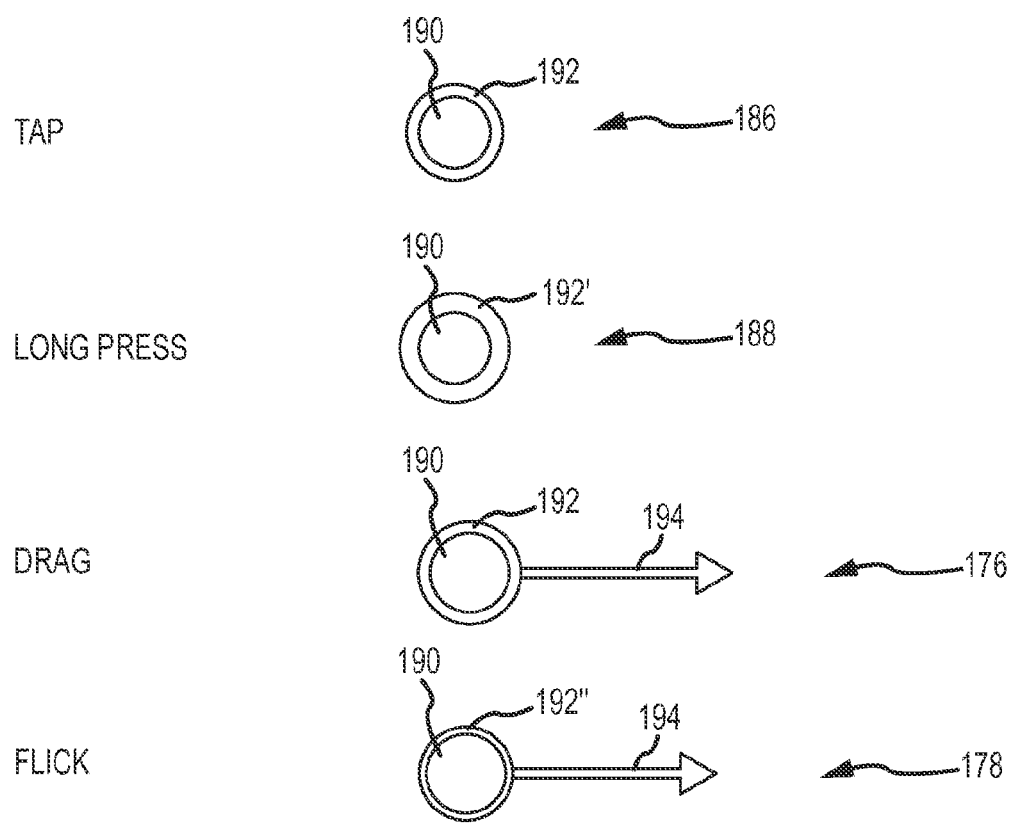
FIG. 4 includes graphical representations of various gesture inputs for controlling a handheld computing device.

FIG. 4 depicts various graphical representations of gesture inputs that may be recognized by a handheld computing device. The gestures shown are demonstrative, and as such, other gestures may be provided without limitation. Such gestures may be received at one or more gesture sensors of the device. In this regard, various input mechanisms may be used in order to generate the gestures shown in FIG. 4. For example a stylus, a user's finger(s), or other devices may be used to activate a touch sensitive device in order to receive the gestures. Alternatively, the gestures may be detected by an optical device (e.g., a camera). The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single touch sensitive device. The use of gesture inputs is particularly suited to handheld computing devices in that the full action of an input may be difficult to execute given the limited input and display space commonly provided on a handheld computing device.

With reference to FIG. 4, a circle 190 may represent a touch received at a touch sensitive device. The circle 190 may include a border 192, the thickness of which may indicate the length of time the touch is held stationary at the touch sensitive device. In this regard, a tap 186 has a thinner border 192 than the border 192' for a long press 188. In this regard, the long press 188 may involve a touch that remains stationary on the touch sensitive display for longer than that of a tap 186. As such, different gestures may be registered depending upon the length of time that the touch remains stationary prior to movement.

A drag 176 involves a touch (represented by circle 190) with movement 194 in a direction. The drag 176 may involve an initiating touch that remains stationary on the touch sensitive device for a certain amount of time represented by the border 192. In contrast, a flick 178 may involve a touch with a shorter dwell time prior to movement than the drag as indicated by the thinner border 192" of the flick 178. Thus, again different gestures may be produced by differing dwell times of a touch prior to movement. The flick 178 may also include movement 194. The direction of movement 194 of the drag and flick 178 may be referred to as the direction of the drag or direction of the flick. Thus, a drag to the right may describe a drag 176 with movement 194 to the right.

Figure 10:
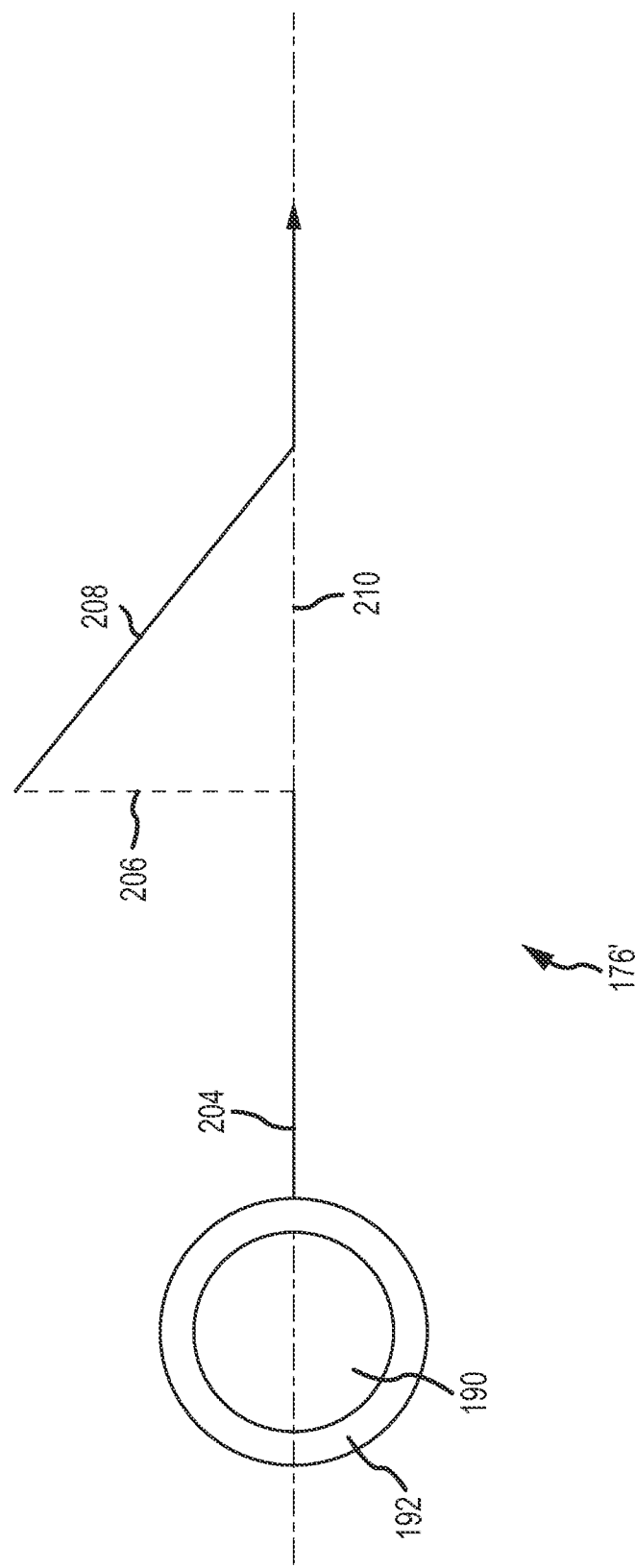
FIG. 10 is a graphical representation of an embodiment of a gesture input.

In an embodiment, a gesture having movement (e.g., a flick or drag gesture as described above) may be limited to movement in a single direction along a first axis. Thus, while movement in a direction different than along the first axis may be disregarded so long as contact with the touch sensitive device is unbroken. In this regard, once a gesture is initiated, movement in a direction not along an axis along which initial movement is registered may be disregarded or only the vector component of movement along the axis may be registered. While the directional gestures (e.g., the drag 176 and flick 178) shown in FIG. 4 include only horizontal motion after the initiation of the gesture, this may not be actual movement of the touch during the gesture. For instance, once the drag 176 is initiated in the horizontal direction, movement in a direction other than in the horizontal direction may not result in movement of the screen to be moved in the direction different and the horizontal direction. For instance, with further reference to FIG. 10, the drag 176 from left to right may be initiated with initial movement 204 from left to right along an initiated direction 210. Subsequently, while the user may input an off direction movement 206 in a direction different than the initiated direction 210. In this regard, the off direction movement 206 may not result in any movement of a screen between two displays. Furthermore, the user may input partially off direction movement 208, where only a vector portion of the movement is in the direction of the initiated direction 210. In this regard, only the portion of the partially off direction movement 208 may result in movement of a screen between displays. In short, the movement of application screens between the first display 102 and the second display 104 may be constrained along a single axis along which the displays are arranged.

One potentially useful feature of a user interface for a handheld computing device is a drawer. A drawer may generally describe a selectively displayable screen that may contain data or information useful to the user. The drawer may be opened (i.e., selectively displayed) by a user by manipulation of a graphical portion. For example, a handle or other graphical portion may be provided to access the drawer. In this regard, a drawer may be operative to be opened into view on a display (e.g., from the periphery of the display) such that the rendered display resembles a drawer being opened from off display to reveal the contents of the drawer. A user may access a drawer by dragging open the drawer by selecting the handle or other graphical portion that allows the drawer to open (that is, slide into view). As such, a drawer may be opened to occupy a majority of a display or may be partially opened to only a partial extent that covers a portion of the display. A subsequent user input may allow the drawer to slide back into its original off display position thus revealing the screen obscured upon opening the drawer.

In this regard, the drawer may be accessed by the user and may contain various information or data. For instance, a drawer may be opened which contains and subsequently displays application data including a listing of the applications stored on the handheld computing device that can be executed thereon. This list may be a text list or include icons corresponding to the applications. The applications may be launched directly from the drawer by selecting the application when the drawer is open. Additionally or alternatively, a drawer may contain other data such as by way of example, notification data, contact data, calendar data, weather data, or other appropriate data a user may access. For instance, the notification data may include information relating to messages (e.g., SMS messages, voicemails, emails, chats, etc) that have been sent by or received by the handheld computing device. The contact data may include contact information from an address book or the like stored on the device. Additionally, other types of information to which quick access may be provided may be provided in the drawer. The drawer may additionally contain links or other objects that may be selected by the user.

For instance, message notifications (e.g., upon receipt of a SMS message, e-mail, etc.) may be displayed in a notification drawer that may be accessed by the user. The drawer may contain a list of received messages including information (e.g., a message subject, time of receipt, sender, etc.) related to each corresponding message. Furthermore, the message notifications may be linked objects, whereupon selection of the message, a messaging application executes or is brought to the foreground so that a user may read the full message, respond, etc.

Further still, as described above, a handheld computing device 100 may be provided with a first display 102 and a second display 104. Such an arrangement is depicted in FIGS. 5A and 5B. In FIG. 5A, a first screen 148a is rendered on a first display 102 and a second screen 148b is rendered on a second display 104. Along the top of the first display 102 and second display 104 may be a first status bar portion 502 and a second status bar portion 504, respectively. The first status bar portion 502 and second status bar portion 504 may display various information to a user including, but not limited to, cellular signal strength, battery life information, cellular carrier information, services being executed by the handheld computing device, and other pertinent information.

A drag gesture 176 may be input by the user that, for instance, may originate adjacent to the first status bar portion 502 and be in a general downward direction (i.e., toward the bottom of the display 102 opposite the status bar portion 502). The result is shown in FIG. 5B, wherein a first drawer portion 500 may be opened in the first display 102. Thus, the first screen 148a is covered by the first drawer portion 500. In alternate embodiments, the first drawer portion 500 may be partially opened to only cover a portion of the first display 102. The first drawer portion 500 may include information as described above. A first handle 506 may also be provided at the bottom of the first drawer portion 500. The first status portion 502 may remain displayed at the top of the screen as is shown in FIG. 5A. While not shown, the first drawer portion 500 may be subsequently closed by a gesture originating near the handle 506 in an upward direction (i.e., toward the top of the first display 102 adjacent the status bar portion 502) so as to close the first drawer portion 500. In FIG. 5B, the second display 104 is unaffected and may be substantially the same as was in FIG. 5A.

FIG. 6A and FIG. 6B depict a handheld computing device similar to that shown in FIGS. 5A and 5B. In FIG. 6A, a drag gesture 176 is received originating adjacent to the second status portion 504 in a downward direction in the second display 104. As such, a second drawer portion 550 may be opened in the second display 104 as shown in FIG. 6B. A second handle 556 may also be provided at the bottom of the second drawer portion 550. A subsequent upward drag gesture originating at the second handle 556 may act to close the second drawer portion 550. The first display 102 may be unaffected by the drag gesture 176 received in FIG. 6A.

In this regard, a drag gesture may be used to individually open a first drawer portion 500 in a first display 102 or a second drawer portion 550 in a second display 104. Whether the first drawer portion 500 or second drawer portion 550 is opened may, at least partially, depend upon a characteristic of the gesture received. For instance, different gestures may be provided that open either the first drawer portion 500, the second drawer portion 550, and/or both drawer portions 500 and 550. Additionally or alternatively, the location at which the gesture input is received may determine which drawer portions are opened. For instance, as described above, a gesture received adjacent to the first display 102 may open a drawer portion 500 therein, whereas a gesture received adjacent to the second display 104 may open a drawer portions 550 therein.

The first drawer portion 500 and second drawer portion 550 may include different information. For instance, the first drawer portion 500 may contain one of the data types potentially displayed in a drawer portion. The second drawer portion 550 may display a different one of the data types displayable in a drawer portion. Additionally, the first drawer portion 500 and second drawer portion 550 may include the same data type such that the data contained in either the first drawer portion 500 or second drawer portion 550 may be accessed in either the first display 102 or second display 104. In the instance where different information is displayed in the first drawer portion 500 and second drawer portion 550, an indication provided in the first status portion 502 or second status portion 504 may indicate which information or data is accessible in a respective one of the drawer portions. For instance, status portion 502 may include an indication as to the contents of the first drawer portion 500 whereas the second status portion 504 may contain an indication regarding the contents of the second drawer portion 550.

In addition to individually controlling a drawer portion as shown in FIG. 5A-6B, both drawer portions may be simultaneously opened by receipt of the gesture input. For instance, a characteristic as described above may dictate whether both drawers are opened. Such a situation is depicted in FIGS. 7A-7B. In FIG. 7A, a drag gesture 176 is received adjacent to the mid-line of the first display 102 and the second display 104. In this regard, there may be a touch sensor or other gesture sensor operative to detect a drag gesture 176 near the adjacent portions of the first display 102 and the second display 104. Alternatively or additionally, a drag gesture 176 received on either the adjacent first display 102 or second display 104 a predefined distance from the right side of the first display 102 or the left side of the second display 104 (e.g., adjacent to the interface of the two displays) may result in functionality as if a drag gesture 176 was received between the two displays. In any regard, a drag gesture 176 received as shown in FIG. 7A or as described herein may result in the simultaneous opening of a first drawer portion 500 and a second drawer portion 550 in a first display 102 and a second display 104, respectively. As was the case in FIGS. 5B and 6B, a first handle portion 506 may be provided with the first drawer portion 500 and a second handle portion 556 may be provided with the second drawer portion 550. In this regard, a drag gesture 176 received adjacent to the first handle portion 506 and second handle portion 556 in an upward direction may simultaneously close the two drawer portions 500 and 550. Alternatively, an individual one of the drawer portions may be selected and closed individually by selecting either one of the first handle portion 506 or the second handle portion 556. In FIG. 7B, the first drawer portion 500 and drawer portion 550 may display different data as described above or may display similar data. In the case where similar data is displayed, first drawer portion 500 and second drawer portion 550 may cooperate to display a single drawer portion spanning both the first display 102 and the second display 104.

FIG. 8A depicts a handheld computing device in a first position wherein a first display 102 is the only visible display from the perspective of a user. The first display 102 may display a first screen (e.g., desktop screen 138a as shown) and include a first status portion 502. The first status portion 502 may contain certain information regarding the status of the device or applications executing on the device. This may include a variety of different types of information, for example, including at least the types of data listed above with regard to the potential contents of the drawer portions. For instance, as shown, cellular signal strength 802, battery information 804, and time information 806 may be displayed in the first status portion 502.

In addition, as described above the handheld computing device may be changed to a second position such that a first display 102 and a second display 104 are concurrently visible from the perspective of a user as shown in FIG. 8B. In turn, a first status portion 502 and second status portion 504 may be displayed on a first display 102 and a second display 104 respectively. In one embodiment, the first status portion 502 may be expanded upon positioning the device in the second position such that at least two displays are concurrently visible as shown in FIG. 8B. In this regard, information displayed on the first status portion 502 when the device is in the first position may be supplemented or new information may be added. The additional information may be in the form of additional types of data or more detailed information regarding the information shown.

For instance, in FIG. 8B, the cellular signal strength 802' has been augmented to shown cellular carrier information as well. Also, the battery information 804' also contains more detailed information (e.g., a percentage of battery charge remaining may be shown). Also, the time information 806' may be expanded to display time and date information. Further still, additional information such as weather information 808 or notification information 810 may be added to the status portions 502, 504 when expanded into both the first display 102 and the second display 104.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for controlling a handheld computing device, comprising:
   displaying a first screen on a first display and a second screen on a second display, wherein the first display has a first hardware display and a first gesture sensor, which is separate from the first hardware display, and wherein the second display has a second hardware display and a second gesture sensor, which is separate from the second hardware display, wherein the first display is positioned adjacent to the second display along an interface, wherein a hinge is provided between the first hardware display and the second hardware display, and wherein the first hardware display is positionable between a first position and a second position with respect to the second hardware display, wherein in the second position the first hardware display and the second hardware display are concurrently visible, and wherein in the first position only one of the first hardware display and the second hardware display are viewable from the perspective of a user;
   maintaining a first drawer that is selectively displayable on the first display and a second drawer that is selectively displayable on the second display, wherein the first drawer and second drawer are operable to contain data comprising notification data, application data, contact data, calendar data, weather data, or a combination thereof, wherein the first drawer and the second drawer contain different data;
   receiving a gesture input at one or more of the first gesture sensor and the second gesture sensor of the handheld computing device, wherein a characteristic of the gesture comprises at least a first location at which the gesture is received and a second location at which the gesture is received, and a direction of the gesture, wherein the first location includes at least a portion of the first display and the second location includes at least a portion of the second display;
   if the gesture is at the first gesture sensor, opening the first drawer;
   if the gesture is at the second gesture sensor, opening the second drawer;
   if the gesture is received at a third location, opening both the first and second drawers, wherein the third location is between the first and second locations, wherein the third location is a predetermined distance from the interface;
   if the gesture is received only on the first hardware display or the second hardware display, a different function is executed;
   wherein a graphical portion is provided with at least the first, second, and third locations, wherein the graphical portion is manipulatable by the user to open one or more corresponding drawers, wherein the graphical portion comprises at least a portion of a status bar, wherein a handle is provided with the one or more corresponding drawers when displayed, and wherein the handle is manipulatable by the user to close the one or more corresponding drawers.

2. The method according to claim 1, wherein additional data is added to one or more of the first and second drawers in the second position.

3. The method according to claim 1, wherein when in the second position, one or more of the first drawer and the second drawer comprises a unitary drawer extending between the first and second displays.

4. The method according to claim 1, wherein one or more of the first and second gesture sensors comprises one or more of a keypad, a trackball, a touch-sensitive device and/or an optical sensor.

5. The method according to claim 1, wherein when in the second position, the first and second displays are used as a unitary display.

6. A system for controlling a handheld computing device, comprising:
   a processor;
   a first display in operative communication with the processor, wherein the first display has a first hardware display and a first gesture sensor, and wherein the first display is operable to selectively display;
   a second display in operative communication with the processor, wherein the second display has a second hardware display and a second gesture sensor, which is separate from the first hardware display, and wherein the second display is operable to selectively display a second drawer containing second data therein, wherein the first display is positioned adjacent to the second display along an interface, wherein a hinge is provided between the first hardware display and the second hardware display, and wherein the first hardware display is positionable between a first position and a second position with respect to the second hardware display, wherein in the second position the first hardware display and the second hardware display are concurrently visible, and wherein in the first position only one of the first hardware display and the second hardware display are viewable from the perspective of a user;
   wherein one or more of the first gesture sensor and the second gesture sensor is operable to receive a gesture input from the user, wherein a characteristic of the gesture comprises at least a first location at which the gesture is received and a second location at which the gesture is received, and a direction of the gesture, wherein the first location includes at least a portion of the first display and the second location includes at least a portion of the second display, wherein upon receipt of said gesture input from the user, the processor is operable to:
   if the gesture is at the first location, open the first drawer;
   if the gesture is at the second location, open the second drawer;
   if the gesture is received at a third location, opening both the first and second drawers, wherein the third location is between the first and second locations, wherein the third location is a predetermined distance from the interface;
   if the gesture is received only on the first hardware display or the second hardware display, a different function is executed;
   wherein the first drawer and second drawer are operable to contain data comprising notification data, application data, contact data, calendar data, weather data, or a combination thereof, wherein the first drawer and the second drawer contain different data; and
   wherein a graphical portion is provided with at least the first, second, and third locations, wherein the graphical portion is manipulatable by the user to open one or more corresponding drawers, wherein the graphical portion comprises at least a portion of a status bar, wherein a handle is provided with the one or more corresponding drawers when displayed, and wherein the handle is manipulatable by the user to close the one or more corresponding drawers.

7. The system according to claim 6, wherein additional data is added to one or more of the first and second drawers in the second position.

8. The system according to claim 6, wherein when in the second position, one or more of the first drawer and the second drawer comprises a unitary drawer extending between the first and second displays.

9. The system according to claim 6, wherein one or more of the first and second gesture sensors comprises one or more of a keypad, a trackball, a touch-sensitive device and/or an optical sensor.

10. The system according to claim 6, wherein when in the second position, the first and second displays are used as a unitary display.

11. A method for controlling a handheld computing device, comprising:
providing the handheld computing device with a first hardware display, a second hardware display, a first gesture sensor, and a second gesture sensor, wherein the first hardware display is positioned adjacent to the second hardware display along an interface, wherein a hinge is provided between the first hardware display and the second hardware display, and wherein the first hardware display is positionable between a first position and a second position with respect to the second hardware display, wherein in the second position the first hardware display and the second hardware display are concurrently visible, and wherein in the first position only one of the first hardware display and the second hardware display are viewable from the perspective of a user;
operating the handheld computing device in the first position,
disposing the handheld computing device in the second position,
wherein at least one of the first and second gesture sensors is operable to receive a gesture input from the user, wherein a characteristic of the gesture comprises at least a first location at which the gesture is received and a second location at which the gesture is received, and a direction of the gesture, wherein the first location includes at least a portion of the first hardware display and the second hardware location includes at least a portion of the second display;
wherein, when in the second position:
if the gesture is at the first location, open a first status portion;
if the gesture is at the second location, open a second status portion;
if the gesture is received at a third location, opening both the first and second status portions, wherein the third location is between the first and second locations, wherein the third location is a predetermined distance from the interface;
if the gesture is received only on the first hardware display or the second hardware display, a different function is executed;
wherein the first status portion and the second status portion are operable to contain data comprising notification data, application data, contact data, calendar data, weather data, or a combination thereof, wherein the first status portion and the second status portion contain different data; and
wherein a graphical portion is provided with at least the first, second, and third locations, wherein the graphical portion is manipulatable by the user to open one or more corresponding status portions, wherein the graphical portion comprises at least a portion of a status bar, wherein a handle is provided with the one or more corresponding status portions when displayed, and wherein the handle is manipulatable by the user to close the one or more corresponding status portions.

12. The method according to claim 11, wherein additional content is added to one or more of the first status portion and the second status portion in the second position.

13. The method according to claim 12, wherein when in the second position, one or more of the first status portion and the second status portion comprises a unitary portion extending between the first and second hardware displays.

14. The method according to claim 11, wherein one or more of the first and second gesture sensors comprises one or more of a keypad, a trackball, a touch-sensitive device and/or an optical sensor.

15. The method according to claim 11, wherein when in the second position, the first and second hardware displays are used as a unitary display.

16. A handheld computing device, comprising:
a processor;
a first display in operative communication with the processor, wherein the first display has a first hardware display and a first gesture sensor, which is separate from the first hardware display;
a second display, wherein the second display has a second hardware display and a second gesture sensor, which is separate from the second hardware display, wherein the first display is positioned adjacent to the second display along an interface;
a hinge between the first and second hardware displays, wherein the first hardware display is positionable between a first position and a second position with respect to the second hardware display, wherein, when in the first position, only one of the first display and the second display are viewable from the perspective of a user, and, when in the second position, the first and the second display are both viewable from the perspective of the user;
wherein in response to a change in position from the first position to the second position, a status bar displayed on the first display is modified to be displayed on the first display and the second display;
wherein at least one of the first and second gesture sensors is operable to receive a gesture input from the user, wherein a characteristic of the gesture comprises at least a first location at which the gesture is received and a second location at which the gesture is received, and a direction of the gesture, wherein the first location includes at least a portion of the first hardware display and the second hardware location includes at least a portion of the second display;
wherein, when in the second position:
if the gesture is at the first location, open a first status portion;
if the gesture is at the second location, open a second status portion;
if the gesture is received at a third location, opening both the first and second status portions, wherein the third location is between the first and second locations, wherein the third location is a predetermined distance from the interface;
if the gesture is received only on the first hardware display or the second hardware display, a different function is executed;

wherein the first status portion and the second status portion are operable to contain data comprising notification data, application data, contact data, calendar data, weather data, or a combination thereof, wherein the first status portion and the second status portion contain different data; and wherein a graphical portion is provided with at least the first, second, and third locations, wherein the graphical portion is manipulatable by the user to open one or more corresponding status portions, wherein the graphical portion comprises at least a portion of a status bar, wherein a handle is provided with the one or more corresponding status portions when displayed, and wherein the handle is manipulatable by the user to close the one or more corresponding status portions.

17. The device according to claim 16, wherein more information is displayed on the status bar when in the second position than when in the first position.

18. The device according to claim 16, wherein when in the second position, one or more of the first status portion and the second status portion comprises a unitary portion extending between the first and second displays.

19. The device according to claim 16, wherein one or more of the first and second gesture sensors comprises one or more of a keypad, a trackball, a touch-sensitive device and/or an optical sensor.

20. The device according to claim 16, wherein when in the second position, the first and second displays are used as a unitary display.

* * * * *